(12) United States Patent
Mori

(10) Patent No.: US 10,009,487 B2
(45) Date of Patent: Jun. 26, 2018

(54) OUTPUT SYSTEM, OUTPUT METHOD, AND OUTPUT APPARATUS

(71) Applicant: Keisuke Mori, Tokyo (JP)

(72) Inventor: Keisuke Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 14/504,686

(22) Filed: Oct. 2, 2014

(65) Prior Publication Data
US 2015/0116764 A1  Apr. 30, 2015

(30) Foreign Application Priority Data

Oct. 31, 2013 (JP) ................................ 2013-226966

(51) Int. Cl.
G06K 15/00 (2006.01)
G06F 3/12 (2006.01)
H04N 1/00 (2006.01)

(52) U.S. Cl.
CPC ....... *H04N 1/00244* (2013.01); *G06F 3/1204* (2013.01); *G06F 3/126* (2013.01);
(Continued)

(58) Field of Classification Search
CPC . H04N 1/00244; G06F 3/1267; G06F 3/1292; G06F 3/1204; G06F 3/1288
(Continued)

(56) References Cited

U.S. PATENT DOCUMENTS 8,009,311 B2 * 8/2011 Takahashi ............. G06F 21/608
358/1.13
2005/0068564 A1 3/2005 Ferlitsch
(Continued)

FOREIGN PATENT DOCUMENTS

JP 2003-173253 6/2003
JP 2010-274629 12/2010
(Continued)

OTHER PUBLICATIONS

Japanese Office Action for 2013-226966 dated Aug. 8, 2017.
Japanese Office Action for 2013-226966 dated Nov. 14, 2017.

*Primary Examiner* — Neil R McLean
*Assistant Examiner* — Darryl V Dottin
(74) *Attorney, Agent, or Firm* — IPUSA, PLLC

(57) ABSTRACT

An output system includes a terminal apparatus, an output apparatus, and an information processing apparatus that are interconnected via a network. The information processing apparatus includes a registration process unit that registers an output request for output data received in one of multiple methods from the terminal apparatus that is operated by a user, a storage destination information storage unit that stores storage destination information for determining a storage destination of the output data, and a unit that provides the output request and the storage destination information when requested by the output apparatus. The output apparatus includes a selection receiving unit that receives a selection of the output request from the user, an output data acquisition unit that determines the storage destination of the output data based on the storage destination information and acquires the output data from the storage destination, and a unit that outputs the output data.

8 Claims, 19 Drawing Sheets

(52) U.S. Cl.
CPC .......... *G06F 3/1267* (2013.01); *G06F 3/1288* (2013.01); *G06F 3/1292* (2013.01); *G06F 3/1238* (2013.01)

(58) Field of Classification Search
USPC ........................................................ 358/1.14
See application file for complete search history.

(56) References Cited

U.S. PATENT DOCUMENTS

| | | | |
|---|---|---|---|
| 2009/0175200 A1* | 7/2009 | Abe .................... | H04L 12/2809 370/254 |
| 2013/0086467 A1* | 4/2013 | Weber .................... | H04W 4/18 715/239 |
| 2013/0094053 A1 | 4/2013 | Shirai | |
| 2013/0242335 A1* | 9/2013 | Naitoh ................ | G06K 15/405 358/1.14 |
| 2013/0250330 A1* | 9/2013 | Chigusa ............. | H04N 1/00973 358/1.13 |

FOREIGN PATENT DOCUMENTS

| | | |
|---|---|---|
| JP | 2011-081741 | 4/2011 |
| JP | 2013-003696 | 1/2013 |
| JP | 2013-088950 | 5/2013 |

\* cited by examiner

FIG.10

| COLUMN NAME | PARAMETER EXAMPLE |
| --- | --- |
| SERVER ID | 1 |
| IP ADDRESS | 192.168.10.11 |
| HOST NAME | Client A PC |
| PORT NUMBER | 8080 |
| PORT NUMBER (https) | 8443 |
| SERVER TYPE | 2(client) |

FIG.11

| COLUMN NAME | PARAMETER EXAMPLE |
| --- | --- |
| DOCUMENT ID | 100 |
| USER NAME | User A |
| SERVER ID | 1 |
| JOB NAME | aaa.Txt |
| DATA STORAGE DESTINATION (DATA PATH) | C:¥data |
| LANGUAGE | PCL |
| NUMBER OF PAGES | 10 |
| PRINT SIDE SETTING | 1(SINGLE SIDE) |
| COLOR INFORMATION | 1(BLACK & WHITE) |
| NUMBER OF COPIES | 5 |

FIG.19

Title

Server Name aaa.Txt    Server
2013/01/01   Pages:10   Copies:1   1Sided   B&W bbb.pdf    Client
2013/12/31   Pages:5   Copies:1   2Sided   COLOR ccc.doc    Server
2013/01/01   Pages:50   Copies:5   1Sided   B&W Select All    1/4   Previous   Next Update Number of Jobs : 10

Change Conditions

Delete

Print

1041

1040

OUTPUT SYSTEM, OUTPUT METHOD, AND OUTPUT APPARATUS

BACKGROUND OF THE INVENTION

1. Field of the Invention

The present invention relates to an output system, an output method, and an output apparatus.

2. Description of the Related Art

For example, an image forming apparatus is known that includes a print data receiving means for receiving print data from a client apparatus; a transferring means for transferring the received print data to a print data accumulating apparatus to have the print data accumulating apparatus accumulate the print data; an acquiring means for acquiring the print data accumulated in the print data accumulating apparatus according to an instruction input by a user; and print control means for printing the acquired print data (see e.g. Japanese Laid-Open Patent Publication No. 2010-274629).

Also, a print system is known that stores information (print data) in a client terminal before transmitting the information to a multifunction peripheral (MFP) when a user issues a print instruction at the client terminal, acquires the information stored in the client terminal of the user after authentication is performed, and prints the information upon receiving an ultimate output instruction from the user (see e.g. Japanese Laid-Open Patent Publication No. 2013-3696).

The so-called pull print system is configured to initially store (accumulate) a print job registered by a client terminal operated by a user and execute the print job at an image forming apparatus in response to a print instruction from the user that has successfully logged in at the image forming apparatus. Pull print systems include those that store the registered print job in a print server apparatus and those that store the registered print job in the client terminal.

The pull print system that stores a print job in a print server apparatus and the pull print system that stores a print job in a client terminal employ different methods of registering a print job. Thus, it has been difficult to use the two pull print systems together.

Note that the above-described problem is encountered not only in print systems such as the pull print system as described above but also other output systems having an output apparatus such as a projector or a monitor that outputs a job stored beforehand by a user at a certain storage destination.

SUMMARY OF THE INVENTION

An aspect of the present invention relates to providing an output system, an output method, and an output apparatus for enabling management of output requests that are registered using a plurality of different registration methods.

According to one embodiment of the present invention, an output system is provided that includes a terminal apparatus, an output apparatus, and at least one information processing apparatus that are interconnected via a network. The information processing apparatus includes a registration process unit configured to register an output request for output data that is received in one of a plurality of methods from the terminal apparatus that is operated by a user, a storage destination information storage unit configured to store storage destination information for determining a storage destination of the output data, and a providing process unit configured to provide the output request and the storage destination information in response to a request from the output apparatus. The output apparatus includes a selection receiving unit configured to receive a selection of the output request from the user, an output data acquisition unit configured to determine the storage destination of the output data of the selected output request based on the storage destination information and acquire the output data from the storage destination, and an output process unit configured to output the acquired output data.

BRIEF DESCRIPTION OF THE DRAWINGS

FIG. 8 illustrates an exemplary functional configuration of a print flow plug-in;

FIG. 9 illustrates an exemplary functional configuration of a job storage plug-in;

FIG. 10 illustrates exemplary data contents of server information;

FIG. 11 illustrates exemplary data contents of print job information;

FIG. 19 illustrates an exemplary print job information list screen;

DESCRIPTION OF THE PREFERRED EMBODIMENTS

In the following, embodiments of the present invention are described with reference to the accompanying drawings.

Note that although a print system is described below as an exemplary embodiment of an output system, the present invention is not limited to a print system but may also be applied to other types of output systems such as an image projection system and a display system that are configured to output a job stored in a storage destination.

<System Configuration>

Figure 1:
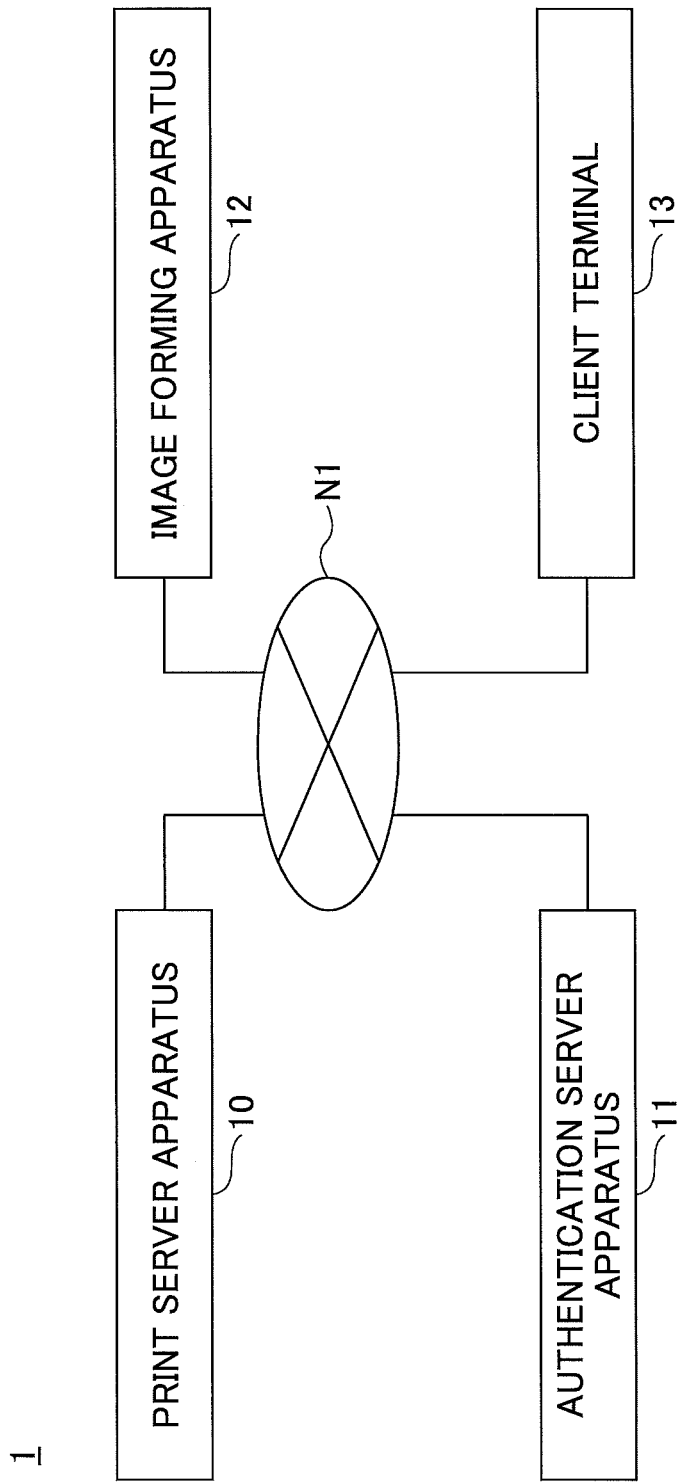
FIG. 1 illustrates an exemplary configuration of a print system according to an embodiment of the present invention.

FIG. 1 is a block diagram illustrating an exemplary configuration of a print system according to an embodiment of the present invention. In FIG. 1, the print system 1 includes a print server apparatus 10, an authentication server apparatus 11, an image forming apparatus 12, and a client terminal 13 that are connected to a network N1 such as a local area network (LAN). The print server apparatus 10, the authentication server apparatus 11, the image forming apparatus 12, and the client terminal 13 may include features for establishing wired or wireless communication. Note that although the exemplary print system illustrated in FIG. 1 includes one of the print server apparatus 10, the authentication server apparatus 11, the image forming apparatus 12, and the client terminal 13, a plurality of the above devices may be included in the print system.

The print server apparatus 10 may be implemented by at least one information processing apparatus. The print server apparatus 10 stores print data and print job information, and transmits the stored print data and print job information to the image forming apparatus 12 in response to a request from the image forming apparatus 12, for example.

The authentication server apparatus 11 may be implemented by at least one information processing apparatus. The authentication server apparatus 11 stores user information, and performs authentication in response to a request from the image forming apparatus 12, for example. The image forming apparatus 12 is an exemplary embodiment of an output apparatus that is connected to the network N1 through wired or wireless communication. The image forming apparatus 12 may be a printing apparatus such as a printer, a copier, a scanner, or a multifunction peripheral (MFP); a display apparatus that displays (outputs) an image on a monitor; or a projection apparatus that projects (outputs) an image on a projector, for example. Also, an audio output apparatus for outputting audio data may be used as the output apparatus, for example.

The client terminal 13 is a terminal apparatus that is operated by a user. The client terminal 13 may be a smartphone, a mobile phone, or a personal computer (PC), for example. In some cases, the client terminal 13 may store print data.

Note that FIG. 1 illustrates merely one exemplary configuration of the print system 1 according to the present embodiment. That is, the print system 1 is not limited to the configuration as illustrated in FIG. 1 but may have other various configurations.

<Hardware Configuration>

Figure 2:
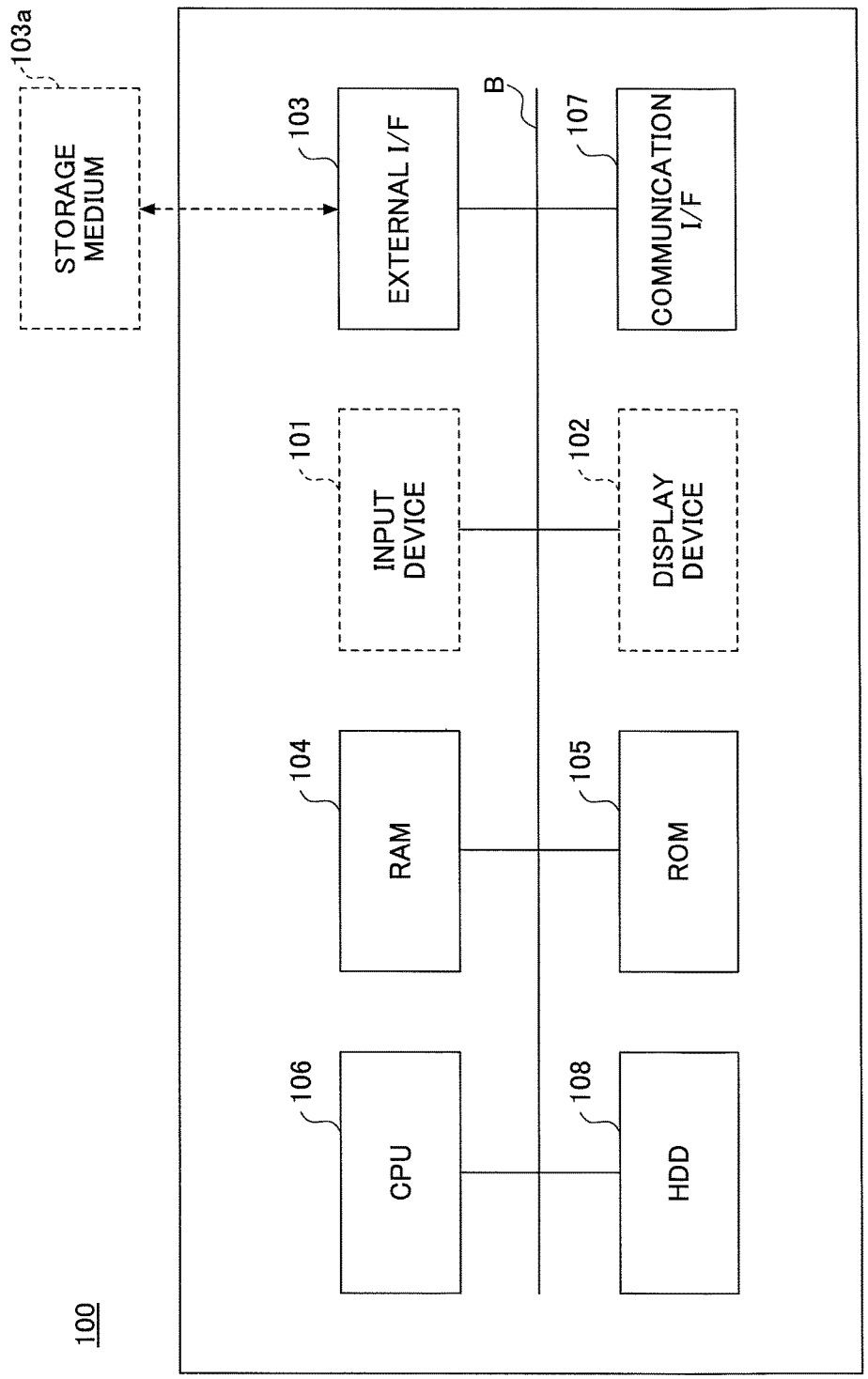
FIG. 2 illustrates an exemplary hardware configuration of a computer according to an embodiment of the present invention.

The print server apparatus 10, the authentication server apparatus 11, and the client terminal 13 may be implemented by a computer having a hardware configuration as illustrated in FIG. 2, for example. FIG. 2 is a block diagram illustrating an exemplary hardware configuration of a computer 100.

In FIG. 2, the computer 100 includes an input device 101, a display device 102, an external I/F 103, a RAM 104, a ROM 105, a CPU 106, a communication I/F 107, and a hard disk drive (HDD) 108 that are interconnected via a bus B. Note that in some embodiments, the input device 101 and the display device 102 may be connected to the computer 100 when they need to be used, for example.

The input device 101 may include a keyboard and/or a mouse, for example, and is used to input various operation signals to the computer 100. The display device 102 may include a display, for example, and is configured to display processing results of the computer 100.

The communication I/F 107 is an interface for connecting the computer 100 to the network N1. In this way, the computer 100 may establish data communication with other computers via the communication I/F 107.

The HDD 108 is a nonvolatile storage device storing programs and data. The programs stored in the HDD 108 may include an operating system (OS) corresponding to basic software controlling overall operations of the computer 100, and application software providing various functions under the control of the OS, for example.

The external I/F 103 is an interface between the computer 100 and an external device. The external device may be a storage medium 103a, for example. The computer 100 may have information read from and/or written on the storage medium 103a via the external I/F 103. Specific examples of the storage medium 103a include a flexible disk, a compact disk (CD), a digital versatile disk (DVD), a SD memory card, a universal serial bus (USB) memory, and the like.

The ROM 105 is a nonvolatile semiconductor memory (storage device) that can store programs and/or data even when the power is turned off. The ROM 105 stores programs and data such as a basic input/output system (BIOS) to be executed when the computer 100 is started, OS settings, network settings, and the like. The RAM 104 is a volatile semiconductor memory (storage device) that temporarily stores programs and/or data.

The CPU 106 includes an arithmetic and logic unit that reads a program and/or data from a storage device such as the ROM 105 and/or the HDD 108, loads the program and/or data in the RAM 104, and executes processes according to the program and/or data to control the overall operations and functions of the computer 100.

The print server apparatus 10, the authentication server apparatus 11, and the client terminal 13 of the present embodiment may implement various processes as described below using the hardware configuration of the computer 100 as illustrated in FIG. 2.

Figure 3:
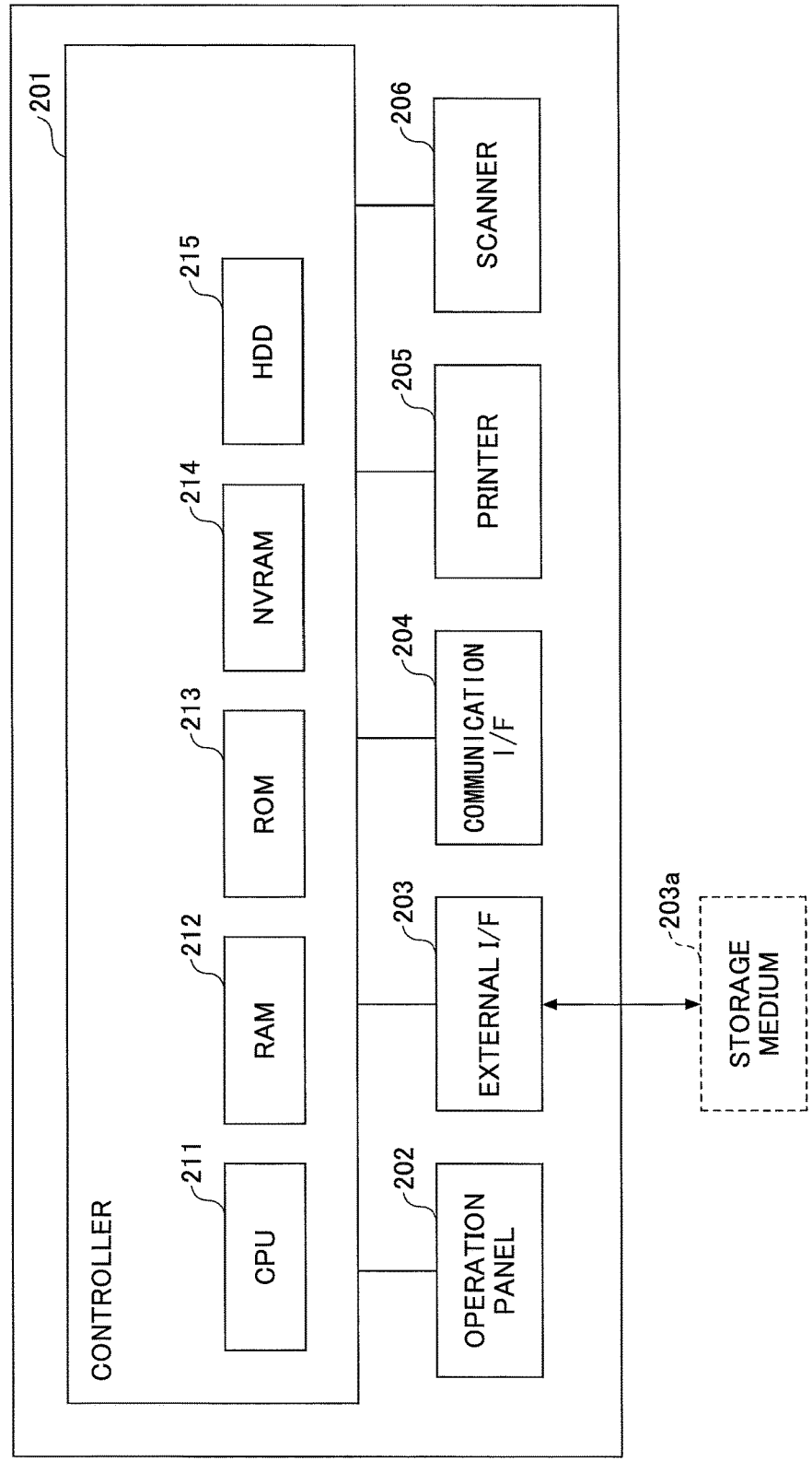
FIG. 3 illustrates an exemplary hardware configuration of an image forming apparatus according to an embodiment of the present invention.

The image forming apparatus 12 illustrated in FIG. 1 may be implemented by a hardware configuration as illustrated in FIG. 3, for example. FIG. 3 is a block diagram illustrating an exemplary hardware configuration of the image forming apparatus 12 according to the present embodiment. In FIG. 3, the image forming apparatus 12 includes a controller 201, an operation panel 202, an external I/F 203, a communication I/F 204, a printer 205, and a scanner 206, for example.

The controller 201 includes a CPU 211, a RAM 212, a ROM 213, a non-volatile RAM (NVRAM) 214, and a HDD 215. The ROM 213 stores various programs and data. The RAM 212 temporarily stores programs and/or data to be used. The NVRAM 214 may store setting information, for example. The HDD 215 stores various programs and data.

The CPU 211 controls the overall operations and functions of the image forming apparatus 12 by loading one or more of the programs, data, and setting information stored in the ROM 213, the NVRAM 214, or the HDD 215 onto the RAM 212, and executing processes accordingly, for example.

The operation panel 202 includes an input unit for receiving an operation input from a user, and a display unit for displaying information. The external I/F 203 is an interface between the image forming apparatus 12 an external device. The external device may be a storage medium 203a, for example. The image forming apparatus 12 may perform read/write operations on the storage medium 203a via the external I/F 203, for example. The storage medium 203a may be an IC card, a flexible disk, a CD, a DVD, a SD memory card, a USB memory, or some other suitable storage medium, for example.

The communication I/F 204 is an interface for connecting the image forming apparatus 12 to the network N1. In this way, the image forming apparatus 12 may establish data communication with other apparatuses via the communication I/F 204. The printer 205 is a printing device that prints (outputs) print data on a sheet such as paper, for example. The scanner 206 is a scanning device that reads image data (electronic data) from an original document, for example.

<Software Configuration>

<<Print Server Apparatus>>

Figure 4:
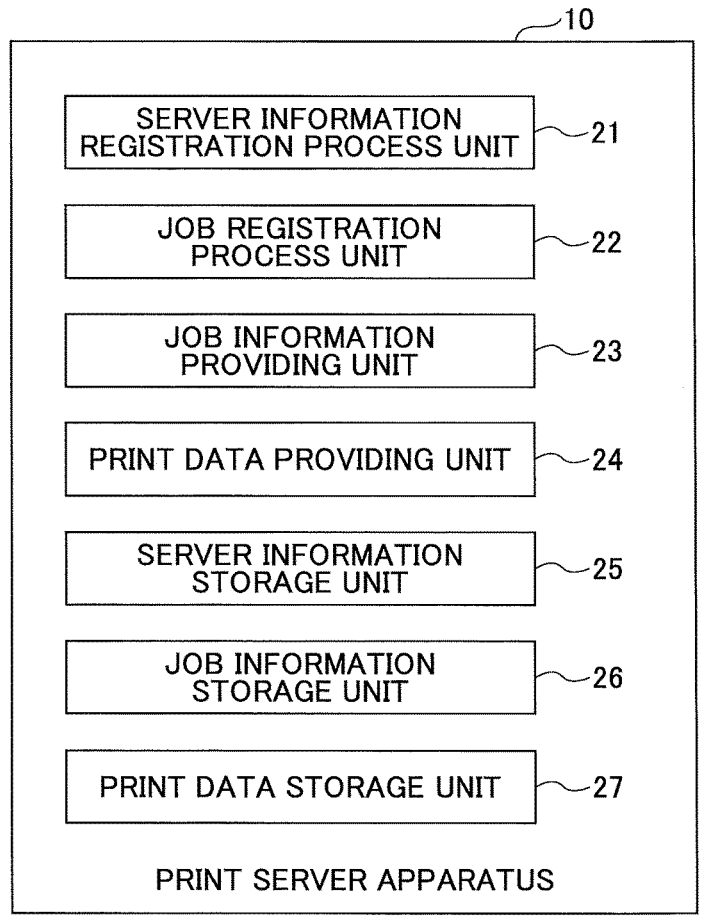
FIG. 4 illustrates an exemplary functional configuration of a print server apparatus according to an embodiment of the present invention.

The print server apparatus 10 of the present embodiment may have a functional configuration as illustrated in FIG. 4, for example. FIG. 4 is a block diagram illustrating an exemplary functional configuration of the print server apparatus 10.

The print server apparatus 10 may execute relevant programs to implement the functions of a server information registration process unit 21, a job registration process unit 22, a job information providing unit 23, a print data providing unit 24, a server information storage unit 25, a job information storage unit 26, and a print data storage unit 27.

The server information registration process unit 21 performs a server information registration process upon receiving a registration of server information from the client terminal 13 as described in detail below. The job registration process unit 22 is configured to receive print jobs in a number of different ways as described below, and perform a job registration process. The job information providing unit 23 provides print job information to the image forming apparatus 12 in response to a request from the image forming apparatus 12.

The print data providing unit 24 provides print data to the image forming apparatus 12 in response to a request from the image forming apparatus 12. The server information storage unit 25 stores server information as described in detail below. The job information storage unit 26 stores print job information. The print data storage unit 27 stores print data.

Figure 5:
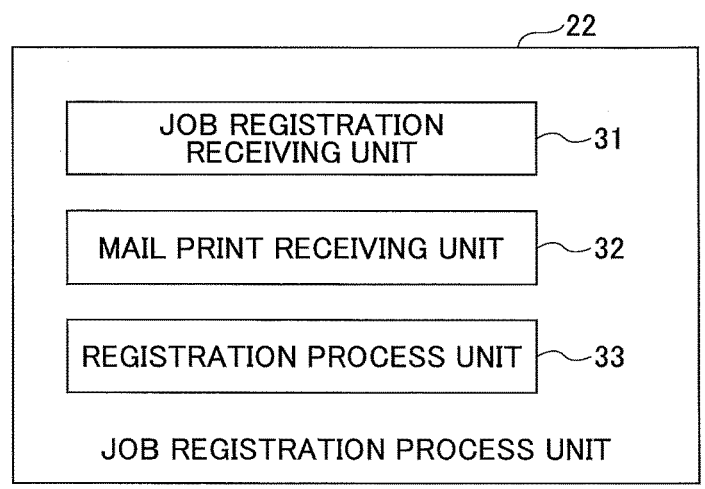
FIG. 5 illustrates an exemplary functional configuration of a job registration process unit.

The job registration process unit 22 of the print server apparatus 10 may have a functional configuration as illustrated in FIG. 5, for example. FIG. 5 is a block diagram illustrating an exemplary functional configuration of the job registration process unit 22.

In FIG. 5, the job registration process unit 22 includes a job registration receiving unit 31, a mail print receiving unit 32, and a registration process unit 33. The job registration receiving unit 31 receives a print job from the client terminal 13 in one of a number of different ways as described in detail below. The mail print receiving unit 32 receives a print job from the client terminal 13 via email as described in detail below. The registration process unit 33 performs a registration process for registering the print job received by the job registration receiving unit 31 or the mail print receiving unit 32.

<<Image Forming Apparatus>>

Figure 6:
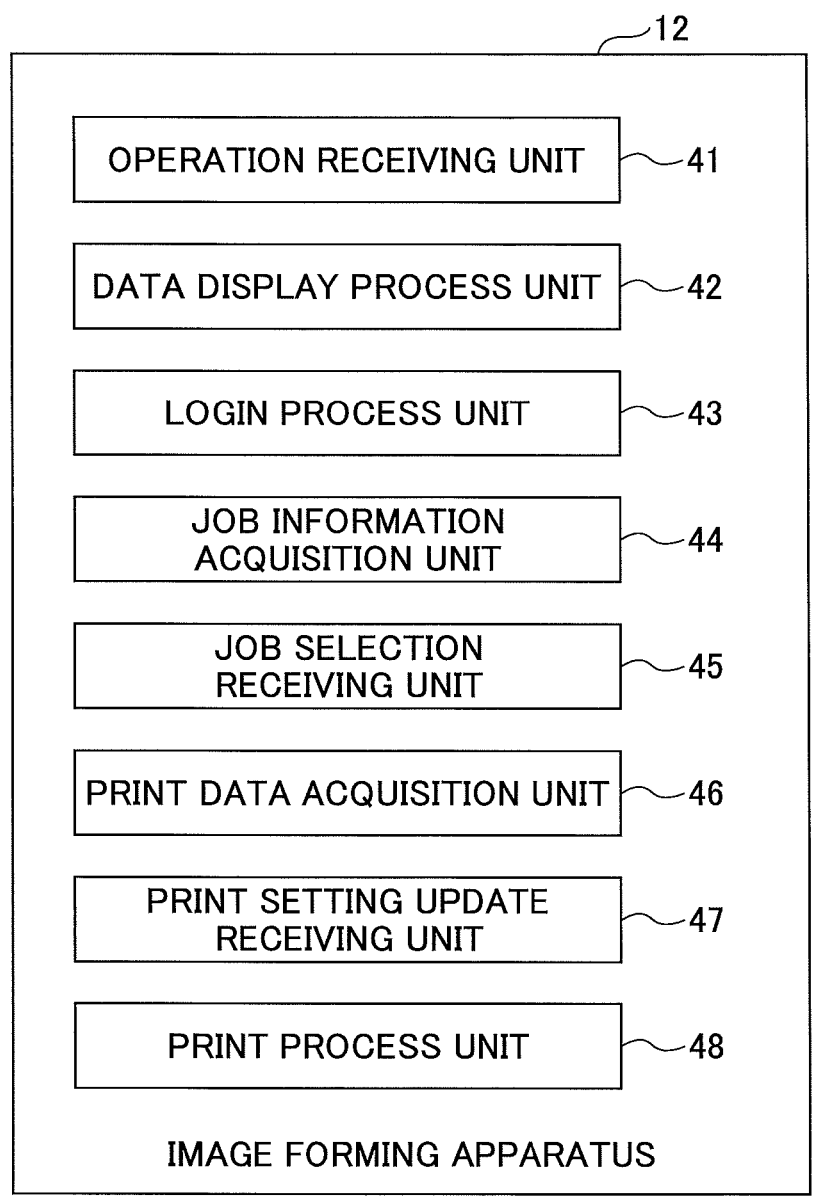
FIG. 6 illustrates an exemplary functional configuration of the image forming apparatus.

The image forming apparatus 12 according to the present embodiment may have a functional configuration as illustrated in FIG. 6, for example. FIG. 6 is a block diagram illustrating an exemplary functional configuration of the image forming apparatus 12 according to the present embodiment.

The image forming apparatus 12 may execute relevant programs to implement the functions of an operation receiving unit 41, a data display process unit 42, a login process unit 43, a job information acquisition unit 44, a job selection receiving unit 45, a print data acquisition unit 46, a print setting update receiving unit 47, and a print process unit 48.

The operation receiving unit 41 receives an operation input from the user. The data display process unit 42 displays information to the user. The login process unit 43 receives a login operation from the user and performs a login process as described below. The job information acquisition unit 44 acquires print job information from the print server apparatus 10.

The job selection receiving unit 45 receives a selection of a print job made by the user from a print job information list screen as described below. The print data acquisition unit 46 acquires print data of the selected print job from the client terminal 13 or the print server apparatus 10 as described below. The print setting update receiving unit 47 updates print settings of print data upon receiving a print setting update (change) request from the user. The print process unit 48 performs a print process for printing the acquired print data according to the print settings of the print data using the printer 205.

<<Client Terminal>>

Figure 7:
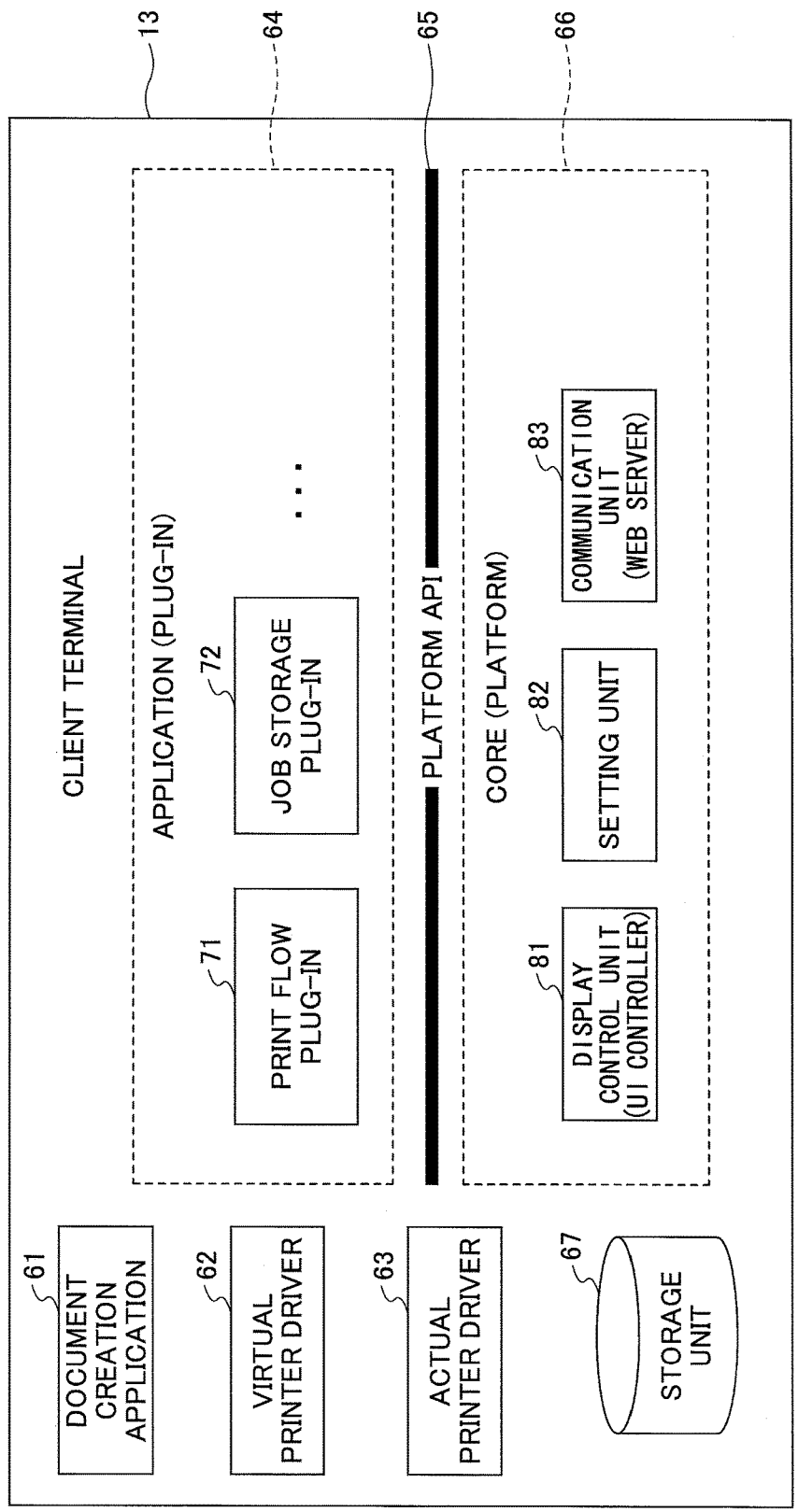
FIG. 7 illustrates an exemplary functional configuration of a client terminal according to an embodiment of the present invention.

The client terminal 13 of the present embodiment may have a functional configuration as illustrated in FIG. 7, for example. FIG. 7 is a block diagram illustrating an exemplary functional configuration of the client terminal 13.

The client terminal 13 may execute relevant programs to implement the functions of a document creation application 61, a virtual printer driver 62, an actual printer driver 63, a plug-in 64, a platform API 65, a platform 66, and a storage unit 67. The plug-in 64 includes a print flow plug-in 71 and a job storage plug-in 72. The platform 66 includes a display control unit (UI controller) 81, a setting unit 82, and a communication unit 83.

The document creation application 61 is an example of an application that receives a print request from a user. Note that the document creation application 61 is merely one illustrative example, and the client terminal 13 may use some other application that receives an output request from the user.

The virtual printer driver 62 is a printer driver that converts application data into print data in a machine-independent intermediate format and outputs the converted print data. The print data in the intermediate format is print data that is not dependent on the specific type of the image forming apparatus 12. Print data in XPS (XML Paper Specification) format is an example of print data (output data) in the intermediate format. The application data is an example of output data.

The actual printer driver 63 is a printer driver that converts application data or print data in the intermediate format into print data in an actual format that enables the image forming apparatus 12 to print the print data. Raw format data is an example of print data (output data) in the actual format.

Note that the application data, the print data in the intermediate format, and the print data in the actual format may be regarded as output data that are configured into various data formats over a period of time from when the user issues an output request for output data until an output apparatus outputs the output data. For example, the application data may be output data in a data format compatible with the application being used.

In other words, the application data, the print data in the intermediate format, and the print data in the actual format may all be considered output data by disregarding the data formats into which the data are converted over the period of time from when an output request for output data is issued until the output data is output.

Also, note that output data of the present embodiment is not limited to print data used for printing. Other examples of output data include display data (image data) to be displayed/projected and audio data to be output. That is, any data adapted for use in one or more output processes such as printing, image display, and/or audio reproduction may be used as output data in an output system according to an embodiment of the present invention.

The plug-in 64 is software that is run on the platform 66. The plug-in 64 uses the platform API 65 to implement the functions of the platform 66. The print flow plug-in 71 of the plug-in 64 controls a print flow. The job storage plug-in 72 stores and manages print jobs.

The platform API 65 is an interface used by the plug-in 64 to implement the functions of the platform 66. The platform API 65 is a pre-defined interface for enabling the platform 66 to receive a request from the plug-in 64 and may be configured by classes and/or functions, for example.

The display control unit 81 of the platform 66 may control display operations of the display unit 102 in response to a request from the document creation application 61 or the plug-in 64, for example. The setting unit 82 is for setting up the plug-in 64. The communication unit 83 establishes communication with the print server apparatus 10, the authentication server apparatus 11, and the image forming apparatus 12, for example. The storage unit 67 may store settings and other relevant information, for example.

The client terminal 13 aggregates processes by aggregating functions commonly used by the plug-in 64 in the platform 66. Note that the configuration illustrated in FIG. 7 is merely one illustrative example and the applications of the client terminal 13 do not necessarily have to be configured into a hierarchical structure as illustrated in FIG. 7. Note, also, that a suitable plug-in for implementing a function desired by the user or the administrator may be installed and used as the plug-in 64. That is, the client terminal 13 does not necessarily have to include the print flow plug-in 71 and the job storage plug-in 72 as illustrated in FIG. 7.

Figure 8:
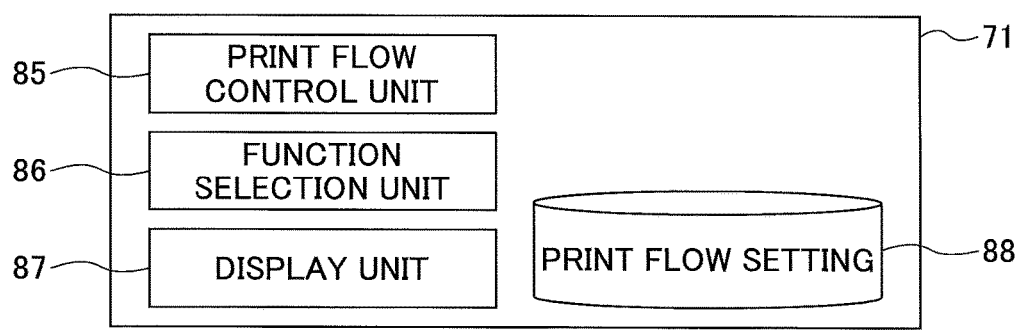

The print flow plug-in 71 of the client terminal 13 may have a functional configuration as illustrated in FIG. 8, for example. FIG. 8 is a block diagram illustrating an exemplary functional configuration of the print flow plug-in 71.

In FIG. 8, the print flow plug-in 71 includes a print flow control unit 85, a function selection unit 86, a display unit 87, and a print flow setting storage unit 88. The print flow control unit 85 controls the print flow. The function selection unit 86 selects functions to be implemented during printing. The display unit 87 displays a function selection screen on the display device 102 as described below. The print flow setting storage unit 88 stores print flow settings.

Figure 9:
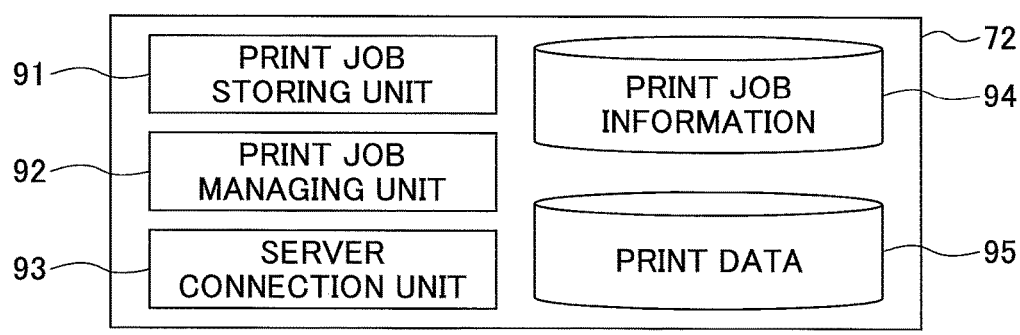

The job storage plug-in 72 of the client terminal 13 may have a functional configuration as illustrated in FIG. 9, for example. FIG. 9 is a block diagram illustrating an exemplary functional configuration of the job storage plug-in 72. In FIG. 9, the job storage plug-in 72 includes a print job storing unit 91, a print job managing unit 92, a server connection unit 93, a print job information storage unit 94, and a print data storage unit 95.

The print job storing unit 91 stores a print job. The print job managing unit 92 manages the print job. The server connection unit 93 establishes connection with the print server apparatus 10, the authentication server apparatus 11, and the image forming apparatus 12, for example. The print job data storage unit 94 stores print job information relating to a print job. The print data storage unit 95 stores print data in the intermediate format as print data of the print job.

<<Server Information>>

FIG. 10 is a table illustrating exemplary data contents of server information. In FIG. 10, the server information includes information items such as server ID, IP address, host name, port number, port number (https), and server type. The server ID is identification information for uniquely identifying the print server apparatus 10 and the client terminal 13 as servers. The IP address is the IP address of the server specified by the server ID.

The host name is the host name of the server specified by the server ID. The port number is the port number of the port used when communicating with the server specified by the server ID. The port number (https) is the port number of the port used when communicating with the server specified by the server ID using encryption. The server type is information indicating the type of the server specified by the server ID; namely, information indicating whether the server is the print server apparatus 10 or the client terminal 13.

For example, upon printing print data of a print job, the image forming apparatus 12 may determine whether the print data is stored in the print server apparatus 10 or the client terminal 13 by searching the server information as illustrated in FIG. 10 using a server ID included in print job information of the print job (described below) as key information, acquiring server information of the server specified by the above server ID, and referring to the server type of the acquired server information. Further, the image forming apparatus 12 may use the server information acquired from the above search to establish communication with the print server apparatus 10 or the client terminal 13 storing the print data and acquire the print data from the print server apparatus 10 or the client terminal 13.

<<Print Job Information>>

FIG. 11 is a table illustrating exemplary data contents of print job information. In FIG. 11, the print job information includes information items such as document ID, user name, server ID, job name, data storage destination, language, number of pages, print side setting, color information, and number of copies.

The document ID is identification information for uniquely identifying the print job. The user name is the name of the user that has registered the print job. The server ID is the server ID of the server storing the print data of the print job. The job name is the name of the print job such as the document name of the print data. The data storage destination indicates where the print data in the intermediate format or the print data in the actual format is stored.

The language indicates the data format of the print data being stored. For example, if the language of the print job information is "XPS", this means that the print data in the intermediate format is stored. If the language is "PCL", this means that the print data in the actual format is stored. Note that print data in the intermediate format refers to print data in a format that enables easy reediting and has common format specifications open to the public. Note that the print data in the intermediate format is not limited to data in XPS format, but may be data in other formats such as PDF (Portable Document Format), for example.

On the other hand, print data in the actual format refers to print data dependent upon the image forming apparatus 12. Note that the print data in the actual format is not limited to data in PCL format, but may be data in other formats such as PS (Post Script), for example.

One of the differences in the characteristics of print data in the intermediate format and print data in the actual format lies in their capability to accommodate changes to settings relating to the output modes of print data (output data editing). Examples of settings relating to the output modes of print data include a print side setting for implementing double side printing or single side printing, a color mode for implementing color printing or black and white printing, and a combine setting for implementing "2 in 1" printing.

For example, print data in XPS format (intermediate format) can accommodate changes in the print side setting, changes in the color mode, and changes in the combine setting. On the other hand, although print data in PCL format (actual format) can accommodate changes in the print side setting and a change from color printing to black and white printing, it cannot accommodate a change from black and white printing to color printing or a change in the combine setting. Note that the capability of the print data in the intermediate format to accommodate a wider range of changes to settings relating to the output modes of print data is one aspect of the capability of the intermediate format to enable easy reediting of output data.

The number of pages represents the number of pages of the print data. The print side setting represents whether the print data is to be printed on one side or two sides of a printing sheet. The color information represents the color mode of the print data. The number of copies represents the number of copies to be printed upon printing the print data. For example, when a user makes a request to register a print job, print job information of the print job specified in the user registration request may be registered in the print job information of FIG. 11.

<Process Operations>

In the following, process operations of the print system 1 according to the present embodiment are described in greater detail.

<<Setup Process at Client Terminal>>

Figure 12:
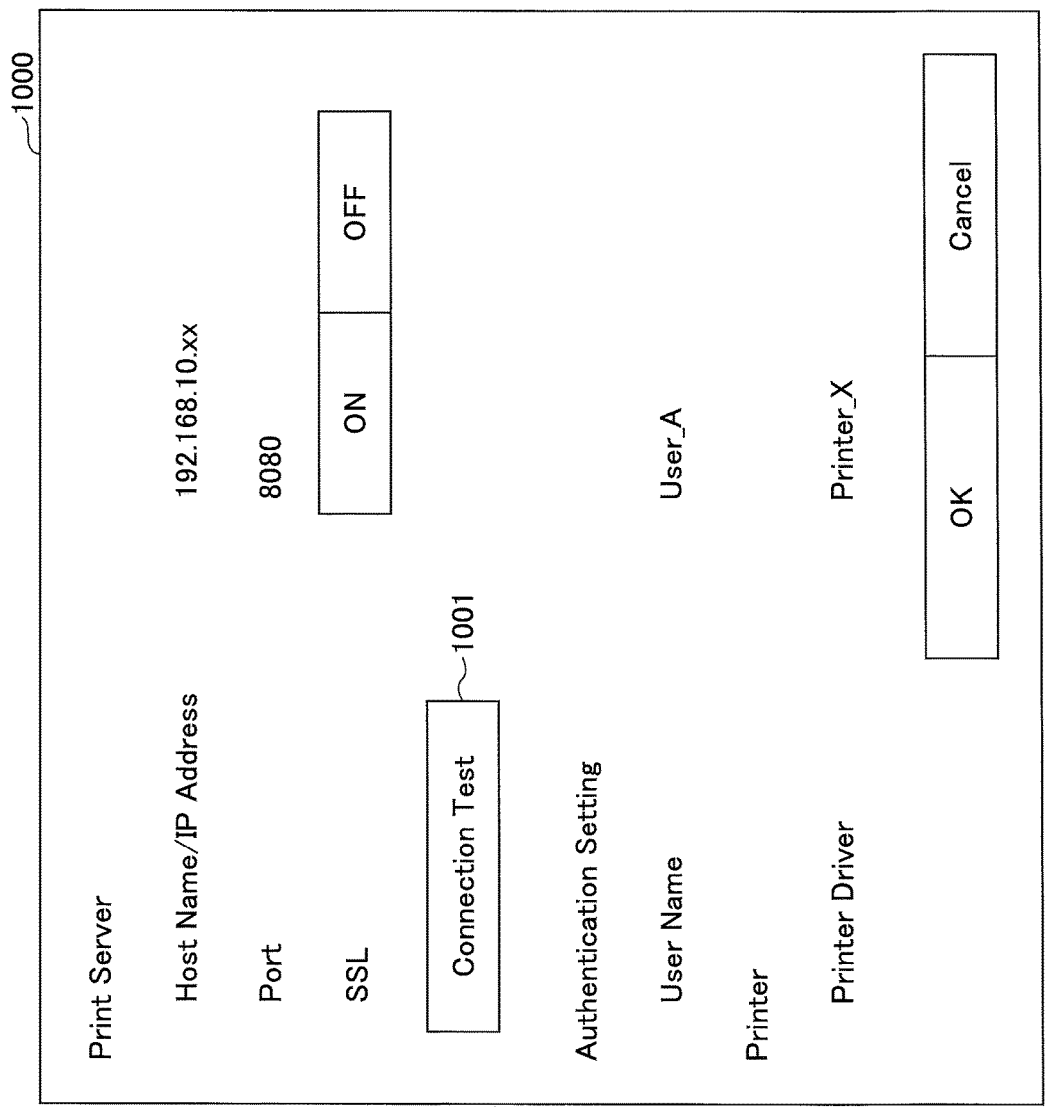
FIG. 12 illustrates an exemplary setting screen of the client terminal.

FIG. 12 illustrates an exemplary screen image of a setting screen 1000 displayed at the client terminal 13. The setting screen 1000 of FIG. 12 enables designation of settings relating to establishing communication with the print server apparatus 10, a user name to be used upon registering a print job, and a printer driver that is to generate print data in the actual format.

Settings for establishing communication with the print server apparatus 10 include a host name/IP address, a port number, and SSL validity (ON/OFF) information. Note that in FIG. 12, the settings for establishing connection with the print server apparatus 10 may be tested by pressing a "Connection Test" button 1001.

<<Server Information Registration Process>>

Figure 13:
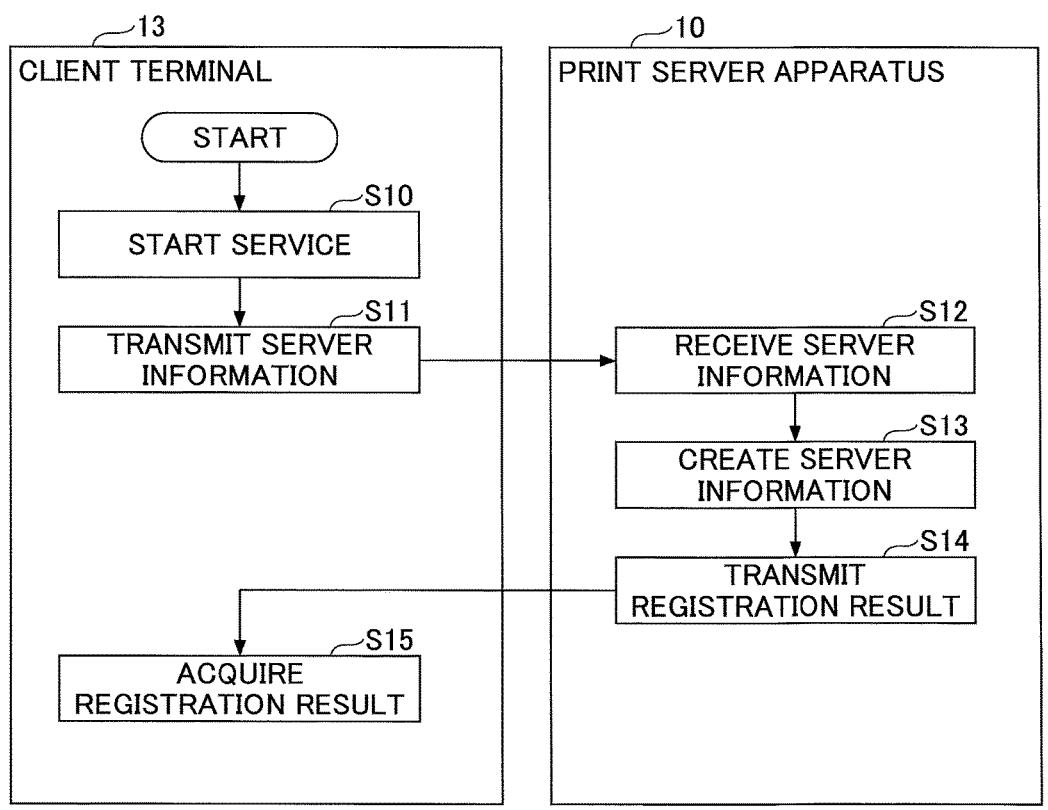
FIG. 13 is a flowchart illustrating exemplary process steps of a server information registration process.

A server information registration process for registering server information as illustrated in FIG. 10 in the print server apparatus 10 may be performed upon starting the client terminal 13, for example. FIG. 13 is a flowchart illustrating exemplary process steps of the server information registration process.

In step S10, the client terminal 13 starts a service by starting the plug-in 64. In step S11, the server connection unit 93 of the job storage plug-in 72 included in the client terminal 13 transmits server information of the client terminal 13 to the print server 10.

In step S12, the server information registration process unit 21 of the print server apparatus 10 receives the server information from the client terminal 13. In step S13, the server information registration process unit 21 checks whether the received server information is stored in the server information storage unit 25 by performing a search process.

If the received server information is not stored in the server information storage unit 25, the server information registration process unit 21 assigns a unique server ID to the received server information to generate new server information corresponding to the received server information and stores the new server information in the server information storage unit 25. In step S14, the server information registration process unit 21 transmits the server ID of the new server information along with the registration result to the client terminal 13. In step S15, the server connection unit 93 of the client terminal 13 acquires the server ID of the new server information and the registration result from the print server apparatus 10.

By setting up the server ID of the acquired server information in the print job information of a print job upon registering the print job, the client terminal 13 may be able to notify the print server apparatus 10 of the storage destination of the print data of the print job. The print server apparatus 10 may be able to identify the server information of the client terminal 13 based on the server ID included in the print job information, and determine whether the print data is stored in the print server apparatus 10 or the client terminal 13 based on the server type specified in the server information.

<<Print Job Storage Process>>

The user may start a print job storage process by opening a print setting screen by operating the document creation application 61 and issuing a print instruction by selecting the virtual printer driver 62, for example.

Figure 14:
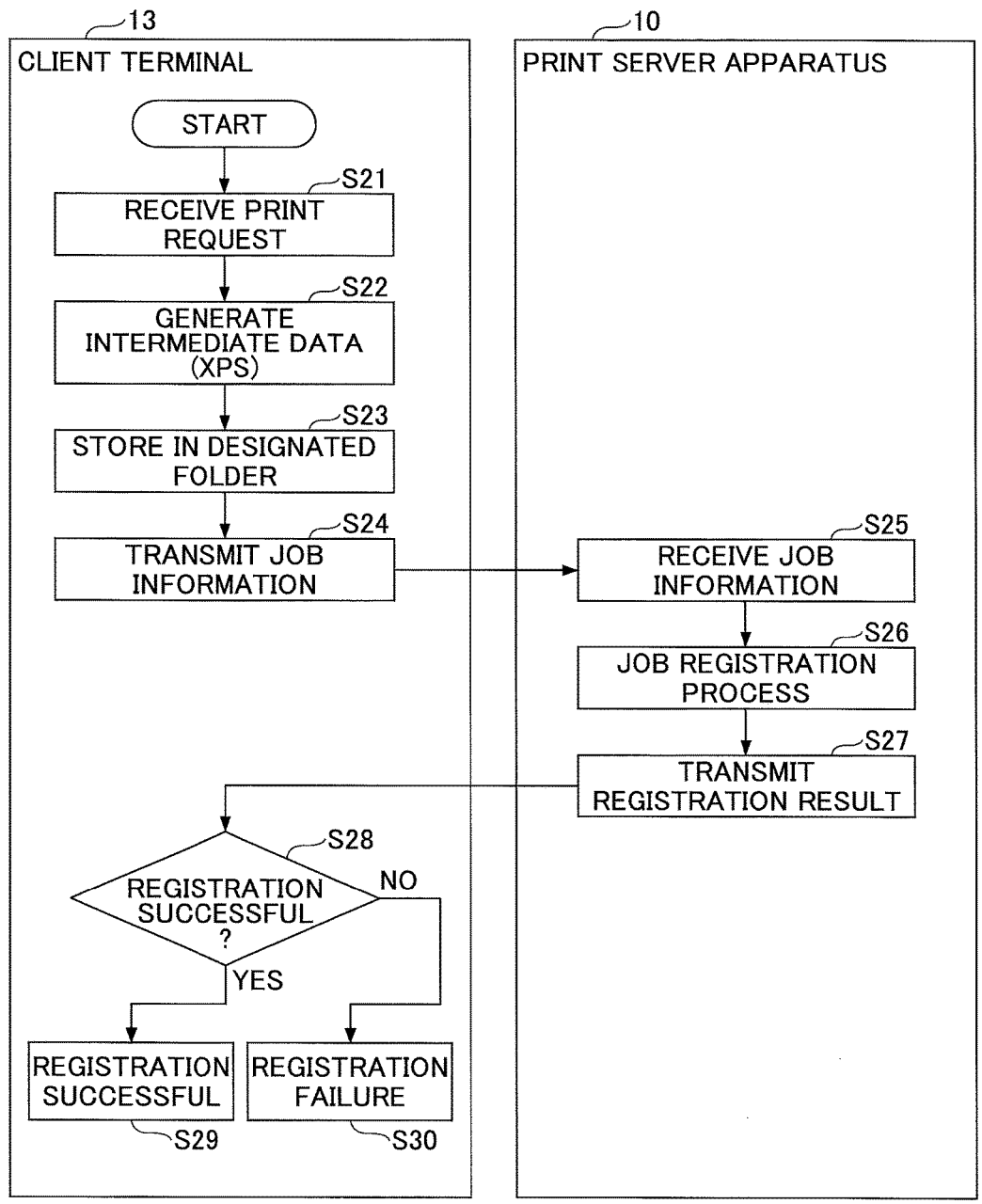
FIG. 14 is a flowchart illustrating exemplary process steps of a print job storage process.

When the user selects the virtual printer driver 62 and issues a print request, the client terminal 13 may start a print job storage process as illustrated in FIG. 14, for example. FIG. 14 is a flowchart illustrating exemplary process steps of the print job storage process.

In step S21, the document creation application 61 transmits a print event to the virtual printer driver 62. The virtual printer driver 62 transmits the print event to the print flow control unit 85 of the print flow plug-in 71.

Also, in step S22, the virtual printer driver 62 converts application data into print data in the intermediate format. Also, the virtual printer driver 62 generates print job information as illustrated in FIG. 11. The print flow control unit 85 controls the display unit 87 to display a function selection screen based on the print event from the virtual printer driver 62.

Figure 15:
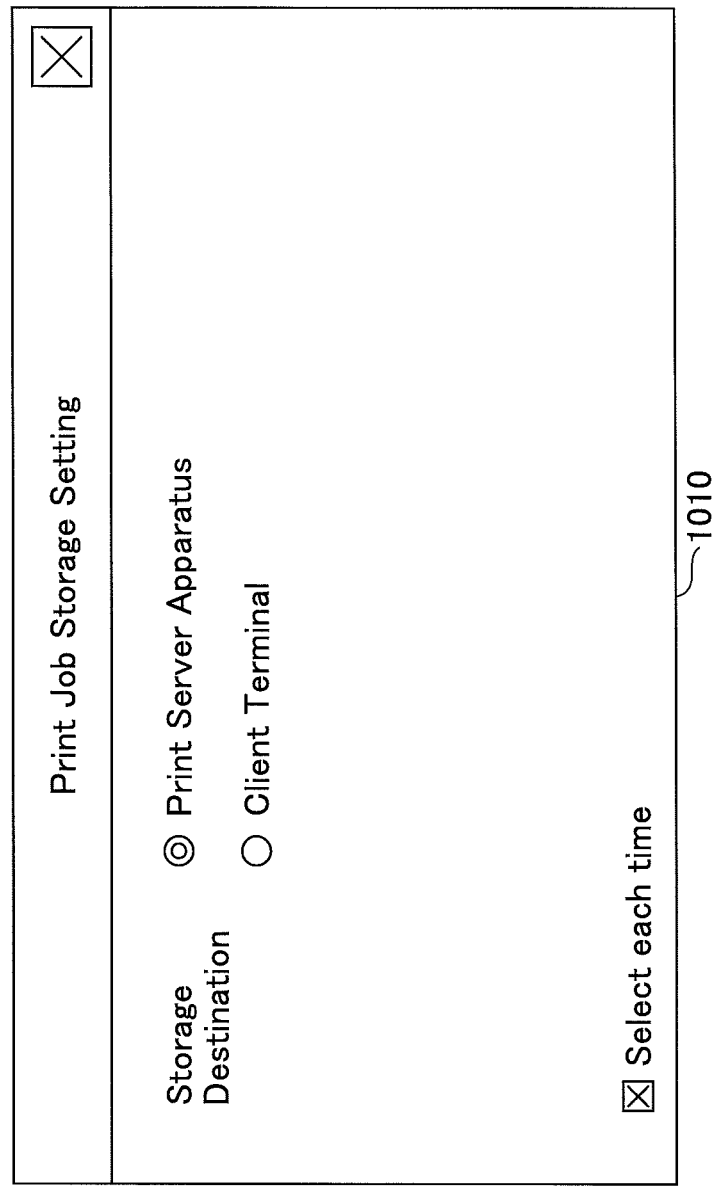
FIG. 15 illustrates an exemplary function selection screen.

FIG. 15 illustrates an exemplary screen image of the function selection screen. The function selection screen 1010 illustrated in FIG. 15 enables the user to select a storage destination of the print data. That is, the user may select the print server apparatus 10 or the client terminal 13 as the storage destination of the print data via the function selection screen 1010 of FIG. 15.

When the user selects "Client Terminal" as the storage destination of the print data, the print job managing unit 92 of the job storage plug-in 72 manages the print data in the intermediate format. When the user selects "Print Server" as the storage destination of the print data, the print job storage unit 91 of the job storage plug-in 72 uses the actual printer driver 63 to generate print data in the actual format from the print data in the intermediate format.

In the following descriptions, it is assumed that "Client Terminal" has been selected as the storage destination of the print data via the function selection screen 1010. In step S23, the print job storage unit 91 of the job storage plug-in 72 stores the print data in the intermediate format in a designated folder that is to be the storage destination (data path) of the print data.

In step S24, the server connection unit 93 transmits the print job information of the print data to the print server apparatus 10. In step S25, the job registration process unit 22 of the print server apparatus 10 receives the print job information from the client terminal 13.

In step S26, the job registration process unit 22 registers the received print job information in the job information storage unit 26. In step S27, the job registration process unit 22 transmits the registration result of the print job information registration to the client terminal 13.

In step S28, the print job storage unit 91 of the client terminal 13 determines whether the registration result of the print job information registration received from the print server apparatus 10 indicates that registration has been successful. If the registration result indicates that registration of the print job information has been successful, the print job storage unit 91 proceeds to step S29 in which a registration success popup screen may be displayed, for example. If the registration result indicates that registration of the print job information has not been successful, the print job storage unit 91 proceeds to step S30 in which a registration failure popup screen may be displayed, for example.

Note that when "Print Server Apparatus" is selected from the function selection screen 1010 of FIG. 15, in step S24, the server connection unit 93 may transmit the print job information and the print data in the actual format to the print server 10. Also, if the print server apparatus 10 has a function of converting print data in the intermediate format into print data in the actual format, the server connection unit 93 may transmit the print data in the intermediate format to the print server 10 rather than transmitting the print data in the actual format.

In step S25, the job registration process unit 22 of the print server 10 receives the print job information and the print data in the actual format from the client terminal 13. In step S26, the job registration process unit 22 registers the received print job information in the job information storage unit 26. The job registration process unit 22 registers the print data in the actual format in the print data storage unit 27. In step S27, the job registration process unit 22 transmits the results of the registration of the print job information and the print data in the actual format to the client terminal 13.

In the print job storage process as illustrated in FIG. 14, the function selection screen 1010 may be displayed each time the user registers a print job and the user may be prompted to select the storage destination of the print data of each print job. Also, in the print job storage process of FIG. 14, print job information of the print data stored in the print server apparatus 10 or the client terminal 13 is registered in the print server apparatus 10.

Figure 16:
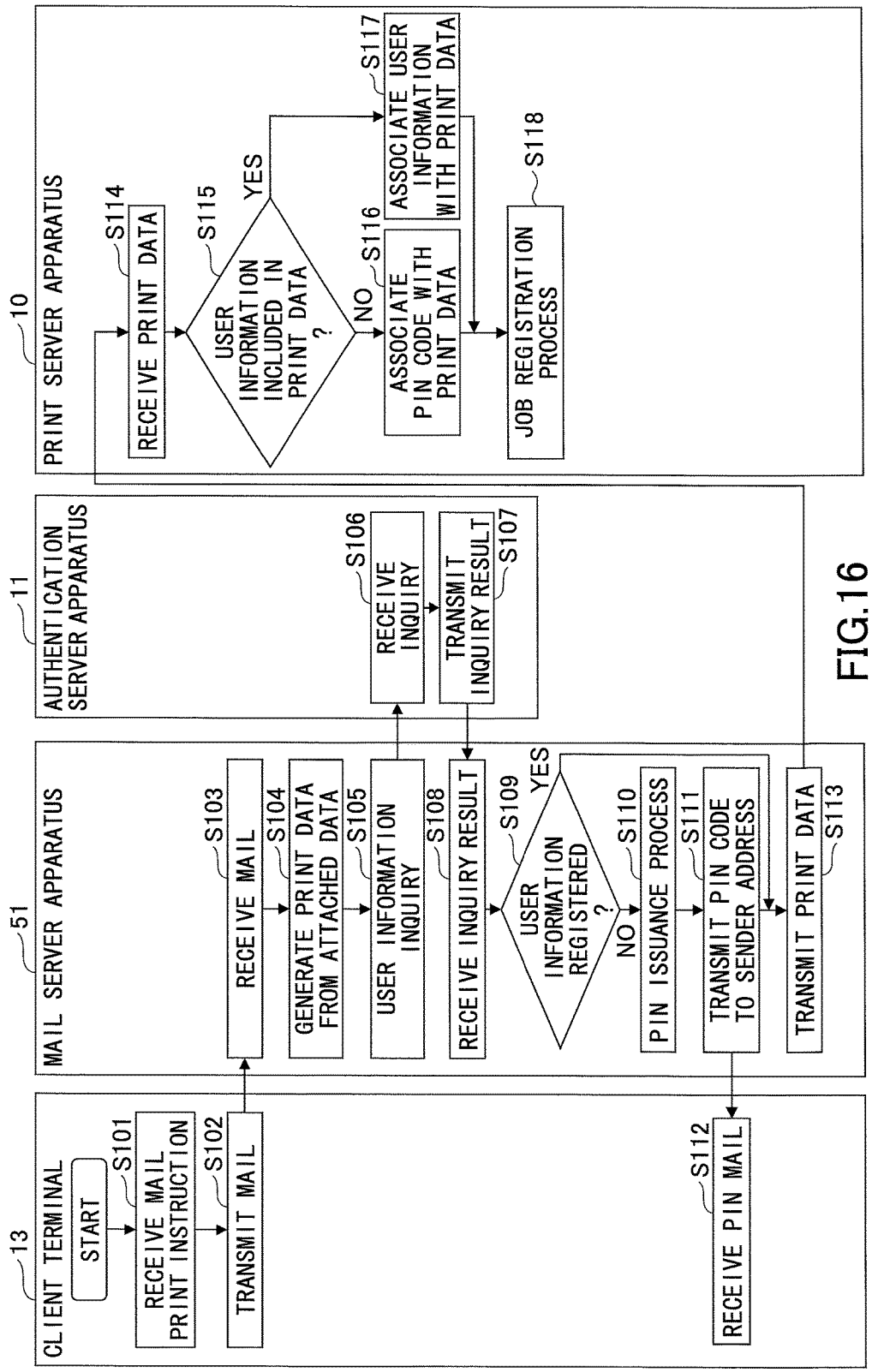
FIG. 16 is a flowchart illustrating exemplary process steps of a print job storage process using a mail print function.

Note that the print job storage process may also be implemented by process steps as illustrated in FIG. 16, for example. FIG. 16 is a flowchart illustrating exemplary process steps of a print job storage process implemented using a mail print function. The user may register a print job in the print server apparatus 10 from the client terminal 13 using a mail print function as described below.

In step S101, the user issues a mail print instruction by generating an email with an attachment including application data as output data, for example, designating a mail print destination, and transmitting the generated email to the mail print destination. The client terminal 13 receives the mail print instruction from the user.

In step S102, the client terminal 13 transmits the email with the application data attached thereto to the mail print destination. In step S103, a mail server apparatus 51 receives the email addressed from the client terminal 13 to the mail print destination.

In step S104, the mail server apparatus 51 generates print data from the application data attached to the received email. Note that the print data generated in this step may be in the intermediate format or the actual format. In the case where the generated print data is in the intermediate format, the print data may subsequently be converted into the actual format at the print server apparatus 10, for example.

In step S105, the mail server apparatus 51 acquires the address of the sender of the email, sends an inquiry to the authentication server apparatus 11 regarding user information of the user issuing the mail print instruction from the sender address.

In step S106, the authentication server apparatus 11 receives the inquiry regarding the user information from the mail server apparatus 51. The authentication server apparatus 11 determines whether user information associated with the acquired sender address is registered. If the user information associated with the sender address is registered, in step S107, the authentication server apparatus 11 transmits the corresponding user information as an inquiry result to the mail server apparatus 51. If user information associated with the sender address is not registered, the authentication server apparatus 11 transmits to the mail server apparatus 51 an inquiry result indicating that user information of the user is not registered.

In step S109, if the user information associated with the sender address is registered, the process proceeds to step S113 where the mail server apparatus 51 transmits the corresponding user information and the print data to the print server 10.

On the other hand, in step S109, if the user information associated with the sender address is not registered, the process proceeds to step S110 where the mail server apparatus 51 issues a PIN code. In step S111, the mail server apparatus 51 transmits an email describing the generated PIN code to the sender address. In step S112, the client terminal 13 receives the email describing the PIN code.

That is, when user information of a user issuing a mail print instruction is not registered in the authentication server apparatus 11, the mail server apparatus 51 transmits a PIN code to the client terminal 13. Then, the process proceeds from step S112 to step S113 where the mail server apparatus 51 transmits the generated PIN code and print data to the print server apparatus 10.

In step S114, the mail print receiving unit 32 included in the job registration process unit 22 of the print server apparatus 10 receives the user information or the PIN code and the print data from the mail server apparatus 51. In step S115, the mail print receiving unit 32 determines whether it has received the user information. Note that in some embodiments, the user information or the PIN code may be configured to be within the print data.

When the user information is not received; namely, when the PIN code is received (step S115, NO), the mail print receiving unit 32 proceeds to step S116 where it associates the PIN code with the print data. When the user information is received (step S115, YES), the mail print receiving unit 32 proceeds to step S117 where it associates the user information with the print data.

After step S116 or S117, the process proceeds to step S118 where the registration process unit 33 of the job registration process unit 22 registers/stores print job information of the print job for the print data in association with the user information or the PIN code in the job information storage unit 26. Note that the registration process unit 33 may receive the print job information via email (print mail). Also, the registration process unit 33 registers/stores the print data of the print job in the print data storage unit 27.

According to an aspect of the present embodiment, a print job registered by the print job storage process using the mail print function as illustrated in FIG. 16 may be managed by the print server apparatus 10 along with a print job registered by the print job storage process as illustrated in FIG. 14, for example.

Note that in some embodiments, the print data generation process of step S104 may be performed at the print server apparatus 10. In this case, the print server apparatus 10 may receive output data (e.g. application data) in step S114 and generate print data from the output data, for example.

<<Login Process at Image Forming Apparatus>>

Figure 17:
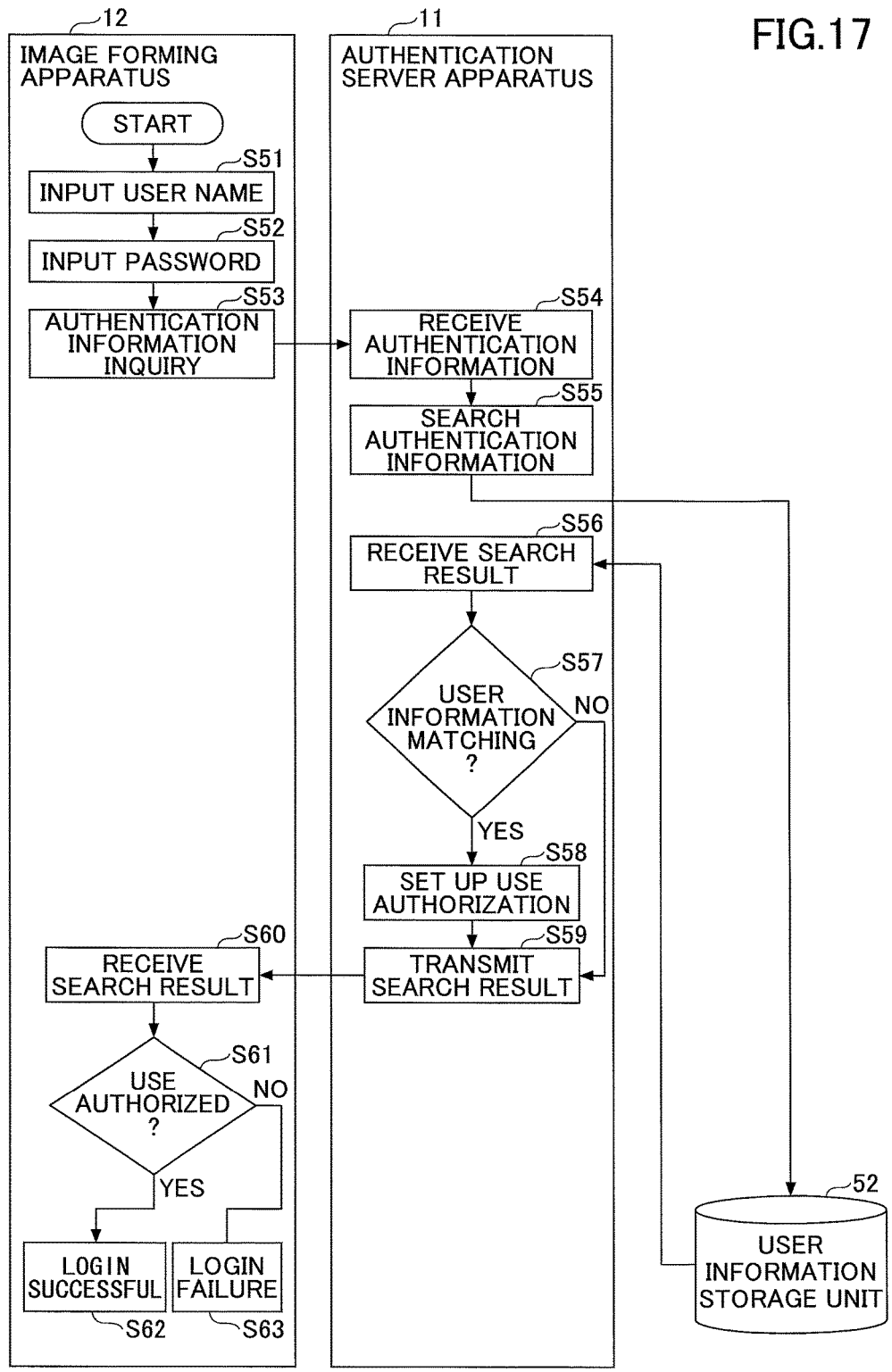
FIG. 17 is a flowchart illustrating exemplary process steps of a login process performed at the image forming apparatus.

The user may log into the image forming apparatus 12 by a login process as illustrated in FIG. 17, for example. FIG. 17 is a flowchart illustrating exemplary process steps of a login process that may be performed at the image forming apparatus 12.

In step S51, the user makes a request to have a login screen displayed by operating the operation panel 202 of the image forming apparatus 12, for example. The operation receiving unit 41 of the image forming apparatus 12 receives the user operation, and prompts the data display process unit 42 to display a login screen.

In step S51, the operation receiving unit 41 receives a user name that is input to the login screen by the user. Also, in step S52, the operation receiving unit 41 receives a password that is input to the login screen by the user. The user name and the password are examples of authentication information of the user. In step S53, the login process unit 43 transmits the user name and the password input via the login screen as authentication information to the authentication server apparatus 11 and makes an inquiry regarding the authentication information.

In step S54, the authentication server apparatus 11 receives the authentication information from the image forming apparatus 12. In step S55, the authentication server apparatus 11 requests a user information storage unit 52 to search for the authentication information received from the image forming apparatus 12. The user information storage unit 52 stores authentication information of authorized users. The user information storage unit 52 searches the authentication information stored therein to determine whether it includes the authentication information received from the image forming apparatus 12, and transmits the search result to the authentication server apparatus 11.

In step S56, the authentication server apparatus 11 receives the search result from the user information storage unit 52. In step S57, the authentication server apparatus 11 determines whether the authentication information stored in the user information storage unit 52 includes authentication information matching that received from the image forming apparatus 12.

If there is a match between the authentication information received from the image forming apparatus 12 and the authentication information stored in the user information storage unit 52, in step S58, the authentication server apparatus 11 sets up use authorization of the user to allow the user to use the image forming apparatus 12. Then, in step S59, the authentication server apparatus 11 transmits a success notification and the use authorization information set up for the user to the image forming apparatus 12.

If there is no match between the authentication information received from the image forming apparatus 12 and the authentication information stored in the user information storage unit 52, in step S59, the authentication server apparatus 11 transmits a failure notification to the image forming apparatus 12.

In step S60, the login process unit 43 of the image forming apparatus 12 receives a result of the inquiry regarding the authentication information from the authentication information server apparatus 11. In step S61, the login process unit 43 of the image forming apparatus 12 determines whether it has received use authorization information as part of the result of the inquiry regarding the authentication information from the authentication server apparatus 11.

If it is determined that use authorization information has been received, the login process unit 43 allows successful login of the user in step S62. Through successful login, the user may be able to use applications and functions of the image forming apparatus 12 within the scope of the use authorization set up for the user. If it is determined that use authorization information has not been received, the login process unit 43 may indicate on the operation panel 202 that the login process ended in failure, for example.

Note that although a user name and a password are used as authentication information in the login process illustrated in FIG. 17, the login process may be performed using other types of information such as IC card registration information, for example. In the case of using IC card registration information in the login process, for example, IC card registration information may be pre-registered in association with a user name or some other form of user identification information in the user information storage unit 52. When IC card registration information that is not associated with user identification information is used in the login process, the login process may involve accepting a process of registering IC card registration information in association with user identification information such as a user name from the image forming apparatus 12, for example.

Figure 18:
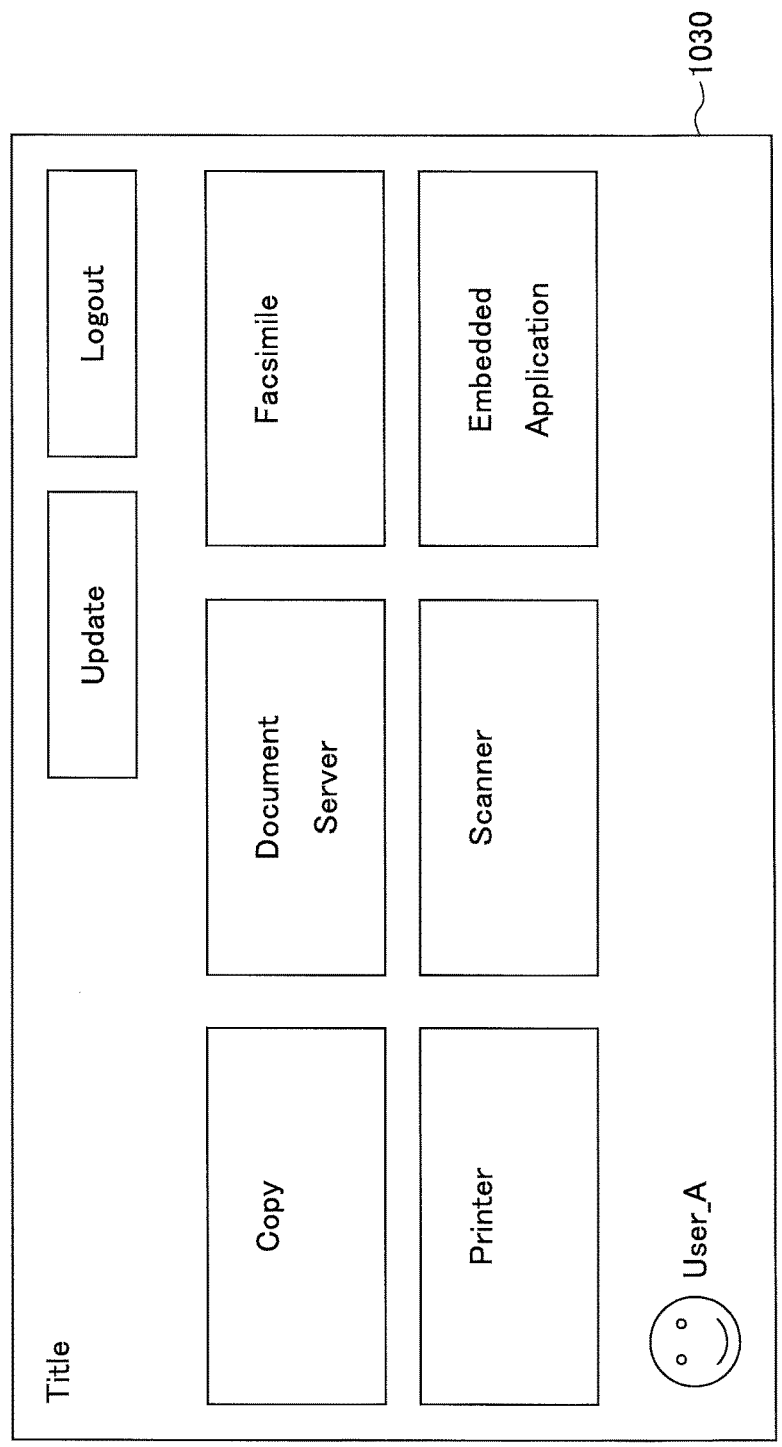
FIG. 18 illustrates an exemplary home screen displayed after a user successfully logs in at the image forming apparatus.

If login is successful, the data display process unit 42 of the image forming apparatus 12 may display a home screen 1030 as illustrated in FIG. 18 on the operation panel 202, for example. FIG. 18 illustrates an exemplary screen image of a home screen that may be displayed at the image forming apparatus 12 after successful login. The home screen 1030 of FIG. 18 displays link buttons to applications such as a copier, a printer, a document server, a scanner, and a facsimile to enable easy access to these applications.

Also, the home screen 1030 of FIG. 18 displays an "Update" button and a "Logout" button to enable the user to smoothly update a screen or logout, for example. Further, the home screen 1030 of FIG. 18 includes an "Embedded Application" link button for enabling the user to set up links to applications other than the above basic applications. Note that the home screen 1030 of FIG. 18 is merely one illustrative example of a home screen, and the layout of the home screen may vary depending on the use authorization of the user and may be changed through user operations, for example.

Note that in some embodiments, instead of inputting a user name and a password into the login screen and making an authentication inquiry, the user may input a PIN code and make a print job execution request for printing print data (PIN code printing). In this case, the image forming apparatus 12 transmits the PIN code to the print server apparatus 10 and makes a PIN code print request. The print server apparatus 10 searches the job information storage unit 26 to identify a PIN code that matches the PIN code received from the image forming apparatus 12, and transmits print data associated with the identified PIN code to the image forming apparatus 12. In turn, the image forming apparatus 12 receives the print data and prints the received print data.

<<Print Job Information List Screen>>

By pressing the link button to the printer application on the home screen 1030, for example, the user may make a request to the image forming apparatus 12 to display a print job information list screen. In response to such a request, the job information acquisition unit 44 of the image forming apparatus 12 makes a request to the print server apparatus 10 for print job information of the user that has successfully logged in. The job information providing unit 23 of the print server apparatus 10 searches for print job information associated with the user name of the user that has successfully logged in.

The job information providing unit 23 also acquires the server ID that is set up in the print job information of the user, and searches for server information associated with the acquired server ID. The job information providing unit 23 transmits the print job information of the user and the server information associated with the acquired server ID to the image forming apparatus 12.

The job information acquisition unit 44 of the image forming apparatus 12 receives from the print server apparatus 10 the print job information of the user that has successfully logged in and the server information associated with the server ID that is set up in the print job information of the user. The data display process unit 42 of the image forming apparatus 12 uses the received print job information of the user and the server information associated with the server ID set up in the print job information of the user to display a print job information list screen as illustrated in FIG. 19, for example.

FIG. 19 illustrates an exemplary screen image of a print job information list screen. The print job list screen 1040 of FIG. 19 includes a print job information list 1041 indicating the print job information of print jobs stored by the user who has successfully logged in. The print job information of each print job included in the print job information list 1041 is represented by a selectable component such as a button.

Note that in the example of FIG. 19, each of the components representing the print job information of a print job stored by the user indicates the document name of the print data, the date the print job storage process was executed, the number of pages, the number of copies, the print side setting, the color information, and the storage destination of the print data.

Also, the print job information list screen 1040 of FIG. 19 includes a "Select All" button, an "Update" button, a "Change Conditions" button, a "Delete" button, and a "Print" button. Further, the print job information list screen 1040 of FIG. 19 displays the number of print jobs stored by the user that has successfully logged in.

The "Select All" button is a button for enabling selection of all the print job information in the print job information list 1041. The "Update" button is a button for updating the print job information list 1041. When the "Update" button is pressed, the job information acquisition unit 44 reacquires the print job information and the server information from the print server apparatus 10.

The "Change Conditions" button is a button for displaying a print setting change screen for changing the print settings of the print job information that is currently selected. The "Delete" button is a button for deleting the print job information that is currently selected. The "Print" button is a button for issuing a print instruction for the print job information that is currently selected.

<<Print Job Output Process>>

The user may make a request to the image forming apparatus 12 to perform a print job output process by selecting the desired print job information from the print job information list 1041 and pressing the "Print" button of the print job information list screen 1040 of FIG. 19, for example.

Figure 20:
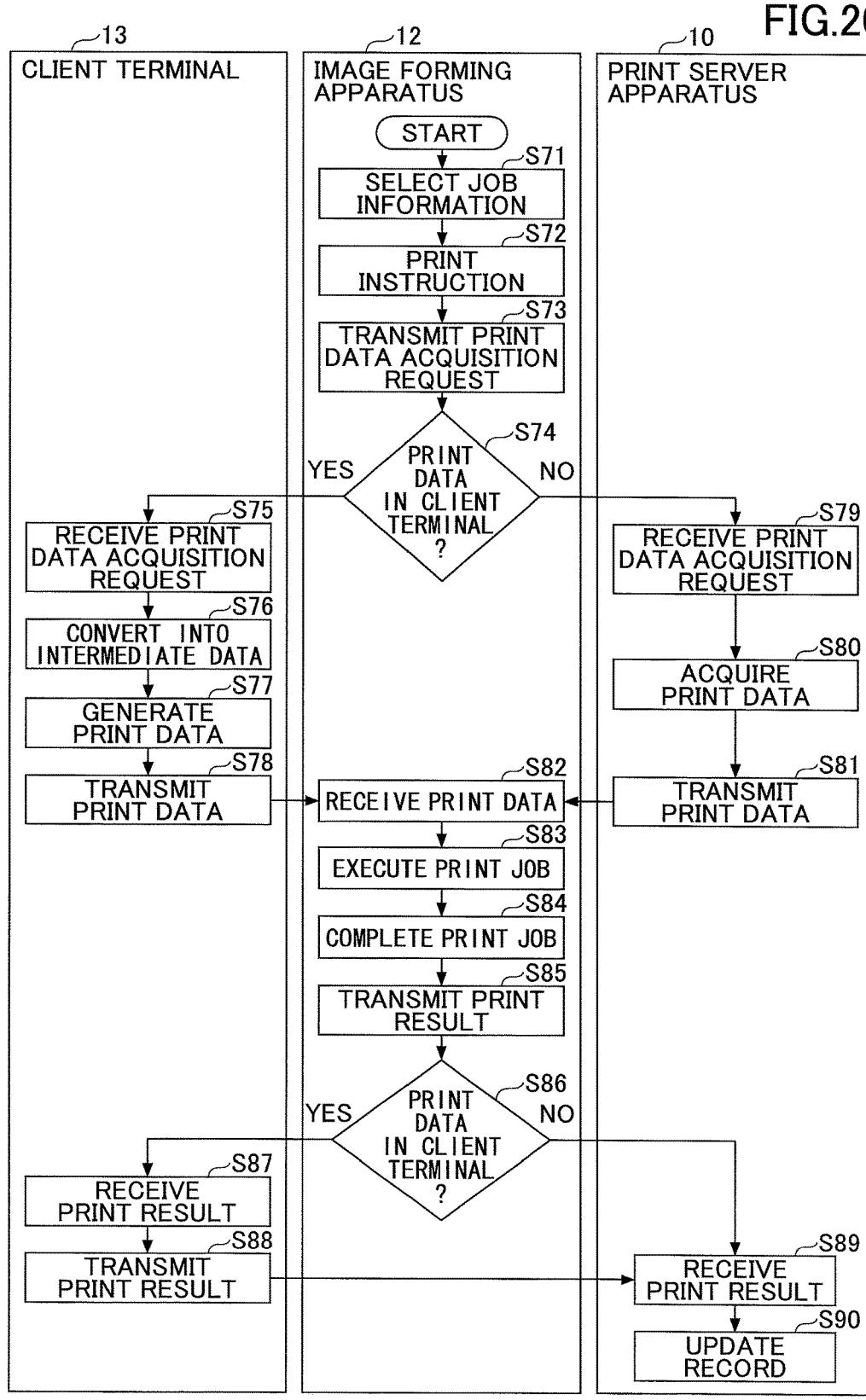
FIG. 20 is a flowchart illustrating exemplary process steps of a print job output process according to an embodiment of the present invention.

FIG. 20 is a flowchart illustrating exemplary process steps of a print job output process according to the present embodiment. In step S71, the job selection receiving unit 45 of the image forming apparatus 12 receives a selection of print job information made by the user from the print job information list 1041 of the print job information list screen 1040 of FIG. 19.

In step S72, when the user presses the "Print" button of the print job information list screen 1040, the job selection receiving unit 45 receives a print instruction to print the print data of the print job information selected in step S71. In step S73, the job selection receiving unit 45 transmits a print data acquisition request to the print data acquisition unit 46 to acquire the print data of the print job information for which the print instruction has been issued.

In step S74, the print data acquisition unit 46 uses the print job information of the print data subject to the print data acquisition request and the server information identified by the server ID set up in the print job information to determine whether the print data is stored in the client terminal 13. For example, the print data acquisition unit 46 may determine whether the print data is stored in the print server apparatus 10 or the client terminal 13 based on information on the server type included in the server information.

If it is determined that the print data is stored in the client terminal 13, the print data acquisition unit 46 searches for the client terminal 13 that stores the print data based on the host name included in the server information. Then, the print data acquisition unit 46 transmits the print data acquisition request to the client terminal 13 that stores the print data.

In step S75, the client terminal 13 receives the print data acquisition request from the image forming apparatus 12. In step S76, the print job managing unit 92 of the job storage plug-in 72 of the client terminal 13 makes a request to the actual printer driver 63 to convert the print data in the intermediate format into print data in the actual format.

In step S77, the actual printer driver 63 converts the print data in the intermediate format into print data in the actual format. Note that the printer driver set up via the setting screen 1000 of FIG. 12 may be used as the actual printer driver 63, for example. In step S78, the server connection unit 93 of the job storage plug-in 72 transmits the print data in the actual format to the image forming apparatus 12 corresponding to the sender of the print data acquisition request.

On the other hand, if it is determined in step S74 that the print data is stored in the print server apparatus 10, the print data acquisition unit 46 of the image forming apparatus 12 transmits the print data acquisition request to the print server apparatus 10.

In step S79, the print server apparatus 10 receives the print data acquisition request from the image forming apparatus 12. In step S80, the print data providing unit 24 of the print server apparatus 10 acquires from the print data storage unit 27 the print data in the actual format that is requested by the image forming apparatus 12. In step S81, the print data providing unit 24 transmits the print data in the actual format to the image forming apparatus 12 corresponding to the sender of the print data acquisition request.

In step S82, the image forming apparatus 12 receives the print data in the actual format from the print server apparatus 10 or the client terminal 13. In step S83, the print process unit 48 of the image forming apparatus 12 executes a print process for printing the received print data in the actual format. In step S84, the print process unit 48 completes the print process.

In step S85, the print process unit 48 starts a transmission process for transmitting a print result of printing the print data in the actual format. In step S86, the print process unit 48 performs a process similar to step S74 to determine whether the print data in the actual format has been received from print server apparatus 10 or the client terminal 13.

If it is determined that the print data in the actual format has been received from the client terminal 13, the print process unit 48 transmits the print result of printing the print data to the client terminal 13. In step S87, the client terminal 13 receives the print result of printing the print data.

In step S88, the print job managing unit 92 of the job storage plug-in 72 of the client terminal 13 performs processes such as deleting the print data based on the print result and then transmits the print result of printing the print data to the print server apparatus 10.

On the other hand, if it is determined in step S86 that the print data in the actual format has been received from the print server apparatus 10, the print process unit 48 transmits the print result of printing the print data to the print server apparatus 10. In step S89, the print server apparatus 10 receives the print result of printing the print data. In step S90, the job registration process unit 22 of the print server apparatus 10 performs processes such as deleting the print data and updating the print job information based on the received print result.

As illustrated in FIG. 20, the image forming apparatus 12 of the print system 1 of the present embodiment can acquire and print out print data stored in the print server apparatus 10 or the client terminal 13 using common procedures. Also, in the case where the print data is stored in the client terminal 13, the image forming apparatus 12 searches for the client terminal 13 storing the desired print data based on the host name set up in the server information rather than using dynamically changing information such as the IP address.

Figure 21:
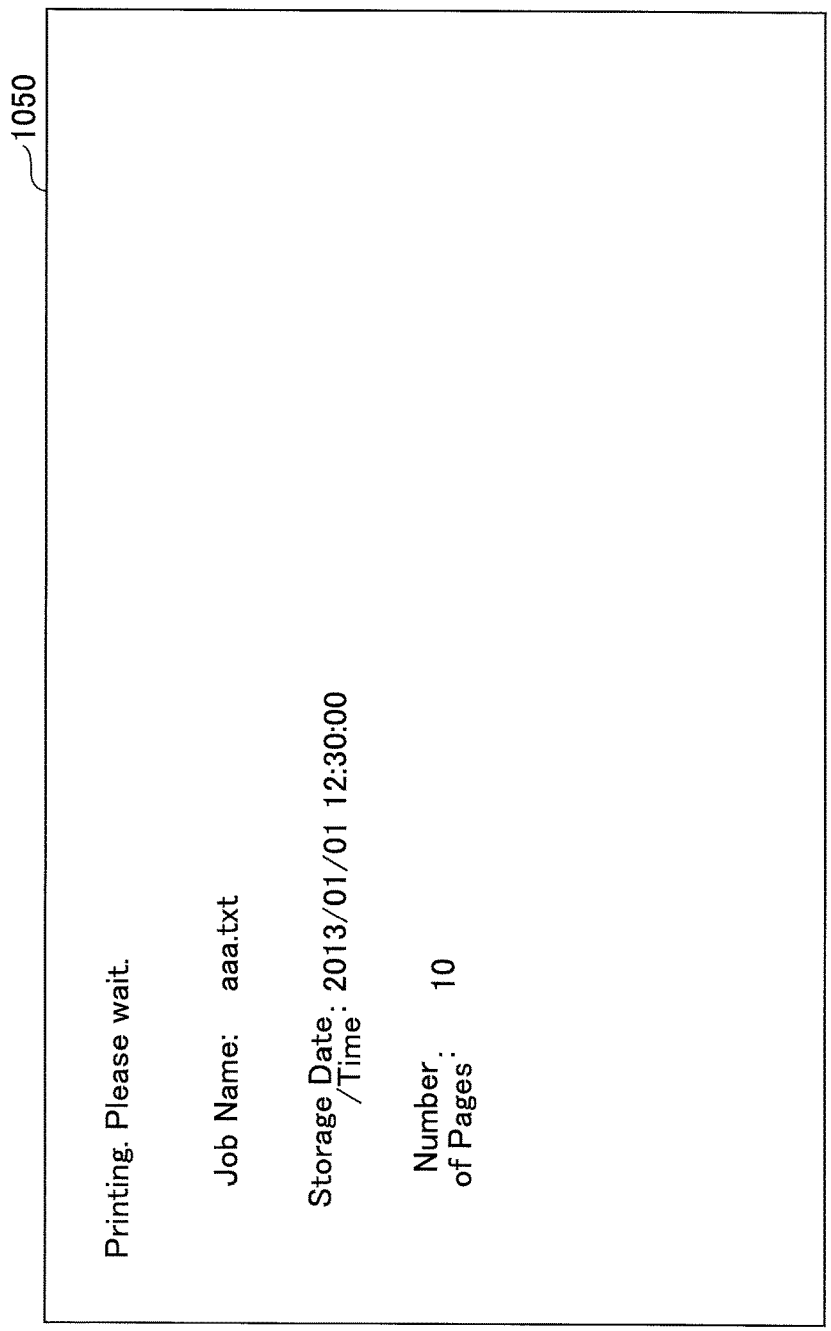
FIG. 21 illustrates an exemplary screen displayed when printing is in progress.

Note that after receiving the print instruction for the print job information in step S72, the data display process unit 42 of the image forming apparatus 12 may display on the operation panel 202 a screen indicating that printing is in progress as illustrated in FIG. 21, for example.

FIG. 21 illustrates an exemplary screen image of a printing screen 1050. The printing screen 1050 of FIG. 21 includes information such as the document name of the print data, the storage date/time of the print data, and the number of pages of the print data so that the user may be able to check details of the print job being executed.

Figure 22:
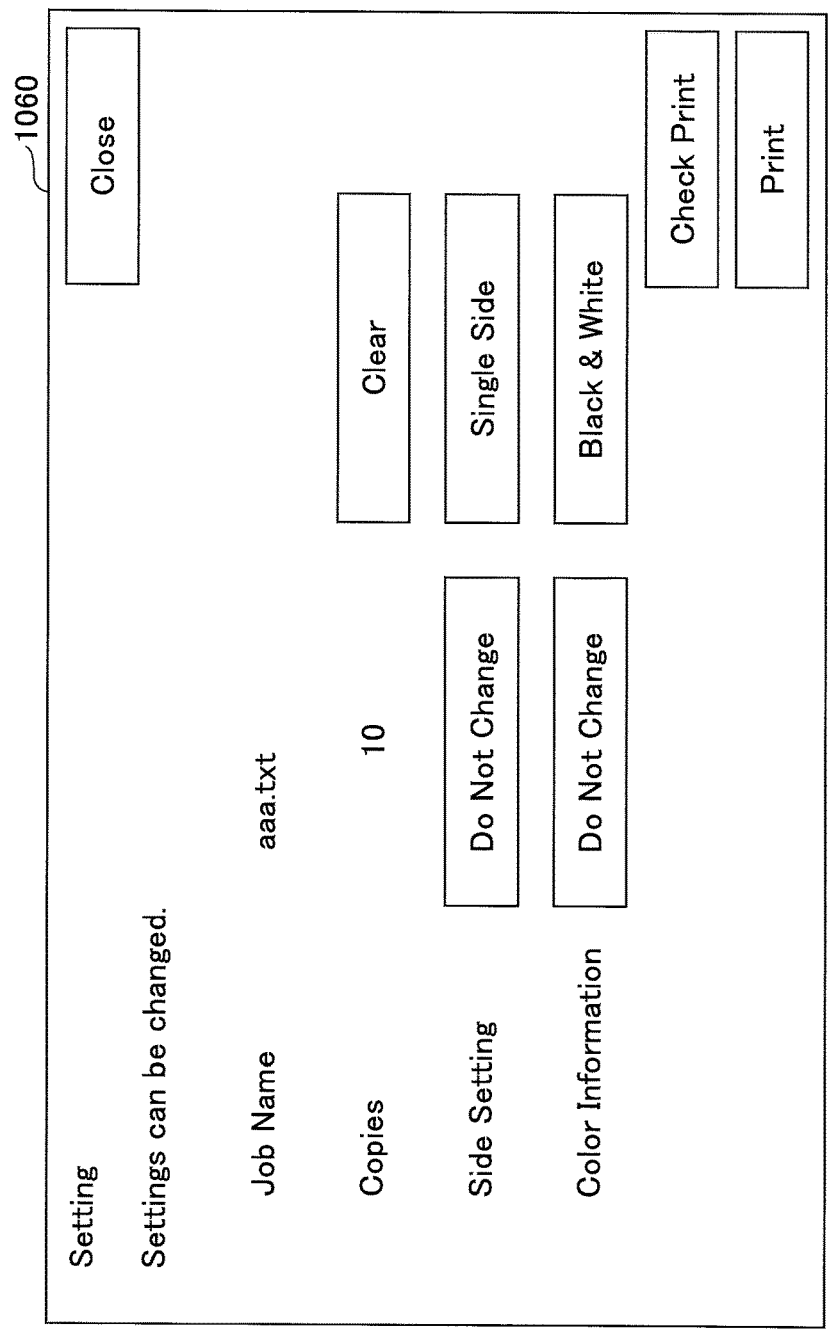
FIG. 22 illustrates an exemplary print setting change screen.

When the "Change Conditions" button of the print job information list screen 1040 of FIG. 19 is pressed, a print setting change screen as illustrated in FIG. 22 may be displayed on the operation panel 202 of the image forming apparatus 12, for example. FIG. 22 illustrates an exemplary screen image of a print setting change screen 1060.

The print setting change screen 1060 of FIG. 22 indicates print settings that can be changed of the print settings of the print job information selected at the time the "Change Conditions" button is pressed. In the print setting change screen 1060 of FIG. 22, the number of copies, the print side setting, and the color information are indicated as examples of print settings that can be changed.

In the print setting change screen 1060 of FIG. 22, the print side setting may be left as is, or changed to single side printing. Also, in the print setting change screen 1060 of FIG. 22, the color information may be left as is or changed to black and white printing. The print setting change screen 1060 of FIG. 22 also includes a "Check Print" button and a "Print" button.

The "Check Print" button is a button for printing one copy of the print data for checking the output. The "Print" button is a button for starting the print process using the print settings displayed on the print setting change screen 1060. When the "Print" button is pressed, the image forming apparatus 12 starts outputting the print data using the print settings displayed on the print setting change screen 1060.

Note that in the print system 1 of the present embodiment, print data in the intermediate format is stored in the client terminal 13. The print data in the intermediate format allows changes to be implemented on a wider range of print settings compared to the print data in the actual format. For example, the print data in the intermediate format can accommodate changes to print settings relating to stapling and punching.

Accordingly, the print system 1 of the present embodiment may display a print setting change screen that can accept changes to print settings relating to stapling and punching, for example, when print job information of print data in the intermediate format is selected.

SUMMARY

According to an aspect of the present embodiment, the print system 1 is capable of managing print data stored in the print server apparatus 10 or the client terminal 13 using print job information registered in the print server apparatus 10. By storing print data in the client terminal 13, the print system 1 of the present embodiment can reduce the required storage capacity of the print server apparatus 10. Also, the print system 1 of the present embodiment can reduce the TCO (Total Cost of Ownership) including implementation costs and maintenance costs. Further, because the print system 1 of the present embodiment allows changes to be implemented on a wider range of print settings after the print data is stored in the client terminal 13, print errors due to operation mistakes made by the user may be prevented to thereby reduce the TCO.

Also, the print server apparatus 10 of the present embodiment can manage print jobs registered in a plurality of different ways such as through a print job registration process implemented by the client terminal 13 using the plug-in 64 and a print job registration process using the mail print function.

In this way, the print system 1 according to the present embodiment provides a mechanism for managing print jobs registered in a plurality of different ways at the print server apparatus 10 and a mechanism for enabling the user to select the storage destination of print data.

Although the present invention has been described above with reference to certain preferred embodiments, the present invention is not limited to these embodiments, and numerous variations and modifications may be made without departing from the scope of the present invention.

For example, in the above-described embodiment, the user is prompted to select the storage destination of print data via the function selection screen 1010 as illustrated in FIG. 15. However, in other embodiments, the user may be prompted to select the data format (e.g. intermediate format or actual format) of the print data as well as the storage destination of the print data, for example. Note that the data format of the print data stored in the storage destination may be determined from the language information included in the print job information of FIG. 11.

Also, the print system 1 described above is merely one illustrative example of an output system according to the present invention. That is, the present invention is not limited to a print system for managing print data and print job information but may be applied to other output systems handling other various types of output data. Also, the client terminal 13 is one illustrative example of a terminal apparatus used by a user to issue an output request for output data or an instruction to execute an output process.

The print server apparatus 10 is one illustrative example of an information processing apparatus (data storage apparatus) that stores output data such as print data and output data related information corresponding to information relating to the output data such as print job information, and transmits the output data and the output data related information to an output apparatus.

Thus, for example, if the output apparatus corresponds to a projector, the print server apparatus 10 may store display data (output data) to be projected (output) by the projector and settings (output data related information) such as the display method to be used upon projecting (outputting) the display data.

Also, in some embodiments, the print server apparatus 10 may store both print data and display data, for example. In this case, the print server apparatus 10 may transmit output data and output data related information to a plurality of different types of output apparatuses that output different types of output data such as a MFP that prints out print data and a projector that projects display data.

The job registration process unit 22 is an illustrative example of a registration process unit including a function of registering an output request received from a terminal apparatus operated by a user. The server information storage unit 25 is an illustrative example of a storage destination information storage unit including a function of storing storage destination information for determining the storage destination of output data.

The job information providing unit 23 is an illustrative example of a providing process unit including a function of providing the output request and the storage destination information in response to a request from the output apparatus. The job selection receiving unit 45 is an illustrative example of a selection receiving unit including a function of receiving a selection of output data to be output (selection of an output request for output data) from the registered output requests. The print data acquisition unit 46 is an example of an output data acquisition unit including a function of determining the storage destination of the output data of the output request and acquiring the output data from the storage destination. The print process unit 48 is an illustrative example of an output process unit including a function of outputting the acquired output data.

The job information acquisition unit 44 is an illustrative example of an output request acquisition unit including a function of acquiring from the information processing apparatus an output request for output data and storage destination information for determining the storage destination of the output data. A print setting change is an example of an output setting change. Also, assuming application data corresponds to output data in a first data format, the print data in the intermediate format is an example of output data in a second data format that is different from the first data format.

The print data in the actual format is an example of output data in a third data format that is different from the data formats of the application data and the print data in the intermediate format.

Note that the present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2013-226966 filed on Oct. 31, 2013, the entire contents of which are hereby incorporated by reference.

What is claimed is:

1. A print system comprising:
an image forming apparatus including a first processor;
at least one information processing apparatus including a second processor and a first memory configured to store print data and job information; and
a terminal apparatus including a third processor and a second memory configured to store print data and job information, wherein
the third processor is configured to:
display two selectable objects for print instruction on one screen, the first selectable object being selected by a user who operates the terminal apparatus when the user requests to store the print data in the first memory, the second selectable object being selected by the user when the user requests to store the print data in the second memory,
send the print data to the at least one information processing apparatus in response to selecting the first selectable object,
register the print data and the job info illation in the second memory and send the job information to the at least one information processing apparatus in response to selecting the second selectable object, the job information being sent to the at least one information processing apparatus including information of a storage destination indicating the print data is stored in the terminal apparatus, and provide the print data stored in the second memory in response to a print data acquisition request of the print data stored in the second memory;

the second processor is configured to:

register the job information sent from the terminal apparatus in the first memory based on selecting the second selectable object, provide a list of the print data and the storage destination of the print data based on the job information stored in the first memory, the print data stored in the first memory and the print data stored in the second memory being included in the list, and provide the print data stored in the first memory in response to the print data acquisition request; and the first processor is configured to:

receive, from the user operating the image forming apparatus, an instruction to print the print data that the user has selected from the list; and acquire the selected print data based on the selected storage destination, the print data being acquired from the at least one information processing apparatus when the storage destination of the acquired print data indicates the at least one information processing apparatus, and the print data being acquired from the terminal apparatus when the storage destination of the print data indicates the terminal apparatus; and print the acquired print data.

2. The print system as claimed in claim 1, wherein the storage destination stored in the memory includes information indicating whether the storage destination of the print data is the terminal apparatus or the at least one information processing apparatus, and information for establishing communication with the selected storage destination of the print data.

3. The output system as claimed in claim 1, wherein the second processor is further configured to:

register the job information in the memory in response to an output request received via an email from the terminal apparatus, wherein the registered print data is generated from an attached file in the email.

4. An output method that is executed in an print system that includes, an image forming apparatus including a first processor, at least one information processing apparatus including a second processor and a first memory configured to store print data and job information, and a terminal apparatus including a third processor and a second memory configured to store print data and job information, the output method comprising:

the terminal apparatus performing processes of:

displaying two selectable objects for print instruction on one screen, the first selectable object being selected by a user who operates the terminal apparatus when the use requests to store the print data in the first memory, the second selectable object being selected by the user when the user requests to store the print data in the second memory, sending the print data to the at least one information processing apparatus in response to selection of the first selectable object, registering the print data and the job information in the second memory and send the job information to the at least one information processing apparatus in response to selection of the second selectable object, the job information sent to the at least one information processing apparatus including information of a storage destination indicating the print data is stored in the terminal apparatus, and providing the print data stored in the second memory in response to a print data acquisition request of the print data stored in the second memory;

the information processing apparatus performing processes of:

registering the job info nation sent from the terminal apparatus in the first memory based on the selection of the second selectable object, providing a list of the print data and the storage destination of the print data based on the job information stored in the first memory, the print data stored in the first memory and the print data stored in the second memory being included in the list, providing the print data stored in the first memory in response to the print data acquisition request; and the image forming apparatus performing processes of:

receiving from the user operating the image forming apparatus, an instruction to print the print data that the user has selected from the list, and acquiring the selected print data based on the selected storage destination, the print data being acquired from the at least one information processing apparatus when the storage destination of the acquired print data indicates the at least one info nation processing apparatus, and the print data being acquired from the terminal apparatus when the storage destination of the print data indicates the terminal apparatus; and printing the acquired print data.

5. The print method as claimed in claim 4, wherein the storage destination stored in the first memory includes information indicating whether the storage destination of the print data is the terminal apparatus or the at least one information processing apparatus, and information for establishing communication with the storage destination of the print data.

6. The output method as claimed in claim 4, further comprising:

registering the job info illation in the memory in response to an output request received via an email from the terminal apparatus, wherein the registered print data is generated from an attached file in the email.

7. The print system as claimed in claim 1, wherein the first processor acquires the print data from the terminal apparatus by searching for the terminal apparatus based on a host name provided by the at least one information processing apparatus.

8. The output method as claimed in claim 4, wherein the image forming apparatus acquires the print data from the terminal apparatus by searching for the terminal apparatus based on a host name provided by the at least one information processing apparatus.

* * * * *